United States Patent [19]

Higashide

[11] 4,028,669
[45] June 7, 1977

[54] PRINTER CONTROL SYSTEM
[75] Inventor: Carlos S. Higashide, Elk Grove Village, Ill.
[73] Assignee: Honeywell Inc., Minneapolis, Minn.
[22] Filed: Jan. 19, 1976
[21] Appl. No.: 650,230
[52] U.S. Cl. .......................... 340/172.5; 101/93.18
[51] Int. Cl.² ........................................ G06F 3/12
[58] Field of Search .................. 340/172.5; 445/1; 101/93.11, 93.18, 93.21, 93.28, 93.29

[56] References Cited
UNITED STATES PATENTS

| | | | |
|---|---|---|---|
| 3,656,427 | 4/1972 | Foley | 101/93 |
| 3,736,868 | 6/1973 | Briggs | 101/93 |
| 3,781,807 | 12/1973 | Saltini | 340/172.5 |
| 3,796,156 | 3/1974 | Marinkovich et al. | 101/93 |
| 3,855,923 | 12/1974 | Foley | 101/93.29 |
| 3,949,367 | 4/1976 | Cochran | 340/172.5 |

Primary Examiner—Mark E. Nusbaum
Attorney, Agent, or Firm—Trevor B. Joike

[57] ABSTRACT

A printer control system is disclosed for receiving data in the form of binary bits over a transmission line from a central processing unit, said data divided into characters to be printed, the control system comprises a rotary drum printer and a control circuit for directing the printer to print the characters. The control circuit has a storage means for receiving and storing the data, a drum trace means for providing an output and dependent upon the drum position, a comparator means for comparing, a character at a time, the data stored in the storage means with the drum position, a serial shift register for storing match and non-match signals between the data to be printed and the drum position and a trigger means for firing, after all stored characters have been compared with the drum position, those hammers of the printer which correspond to the matches between the data and the drum position. The characters are similarly compared to the next drum position and so on until the drum makes a complete revolution by which time all characters have been printed. In addition, the storage means comprises a memory which is divided into halves and the printer control circuit writes into one half the data received and prints the data stored in the second half and includes means for controlling into which half of the memory data is being written and out of which half data is being read.

28 Claims, 25 Drawing Figures

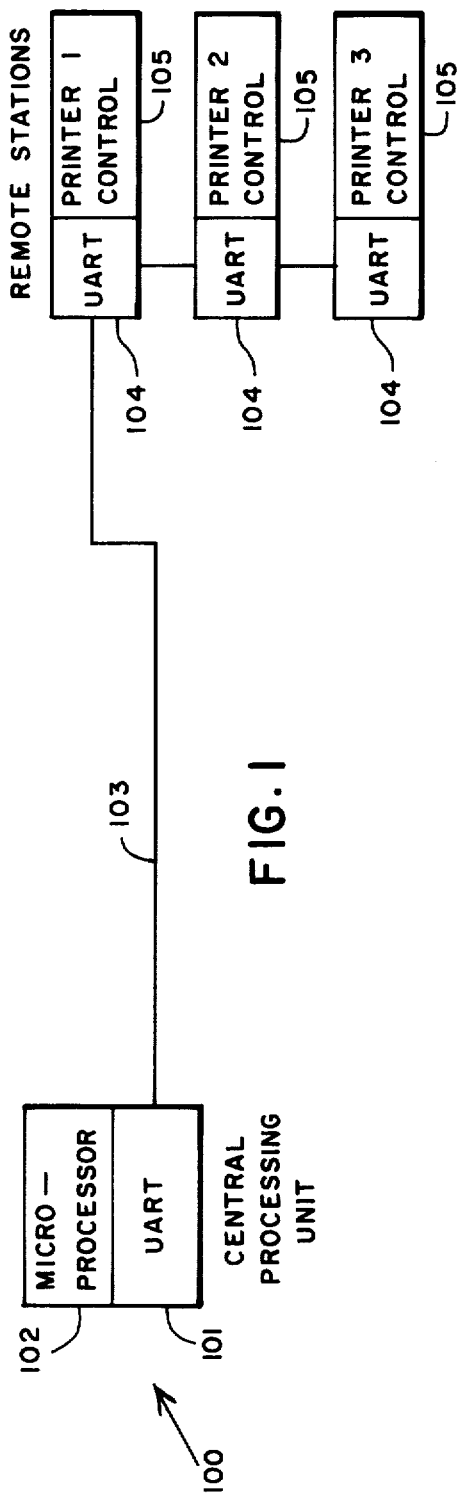
FIG. 1
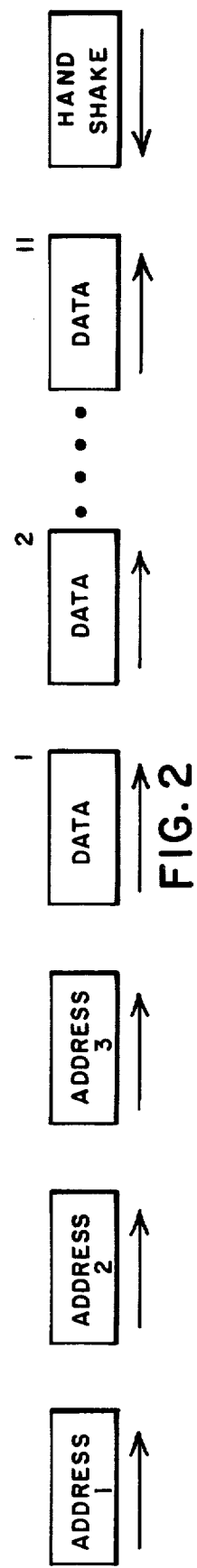
FIG. 2
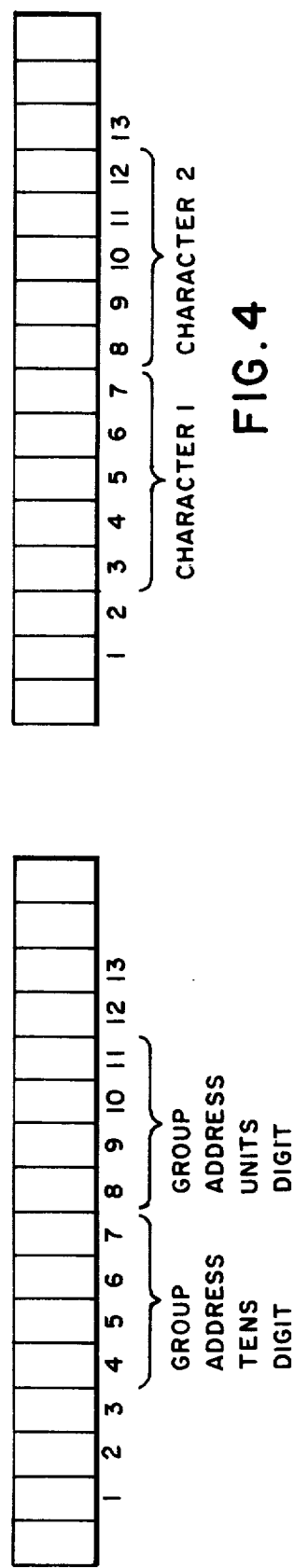
FIG. 3
FIG. 4

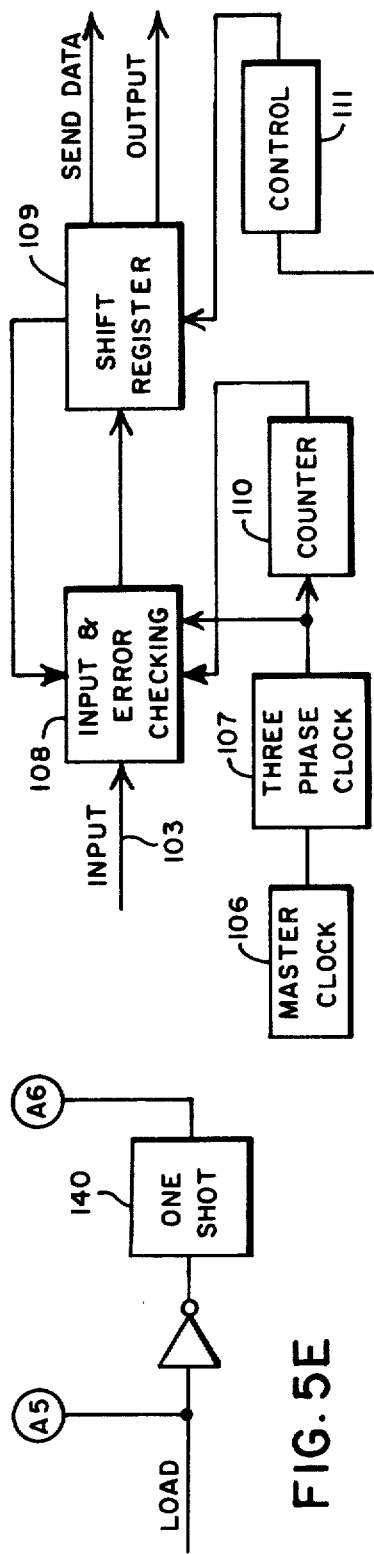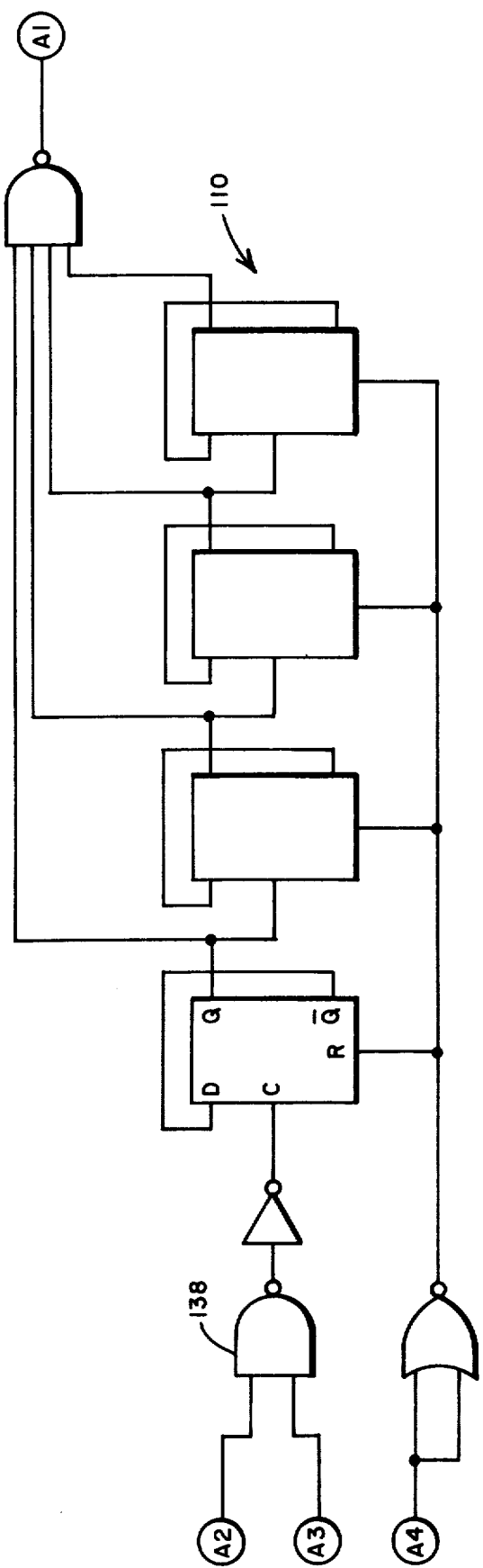
FIG. 5
FIG. 5D
FIG. 5E

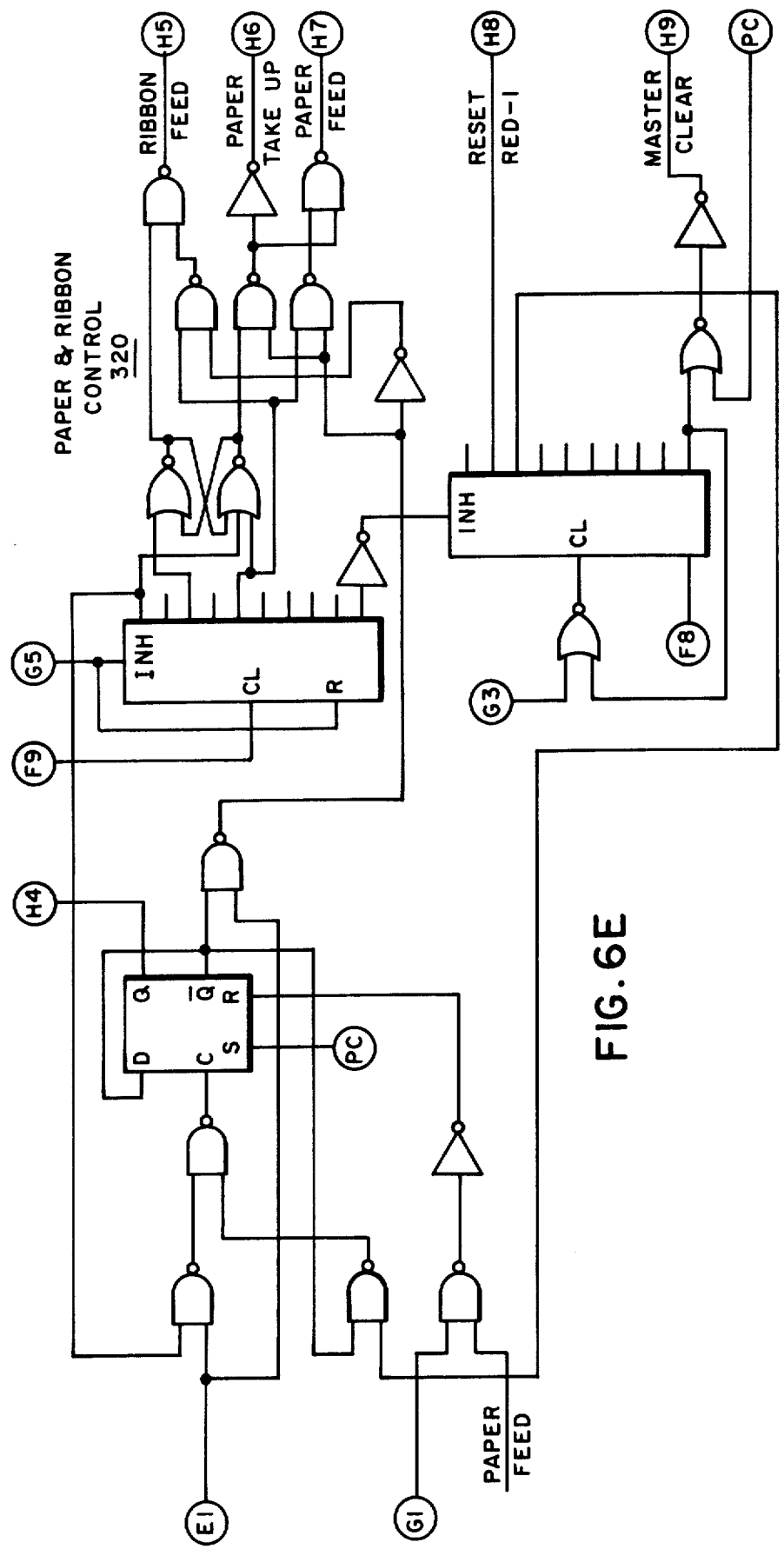
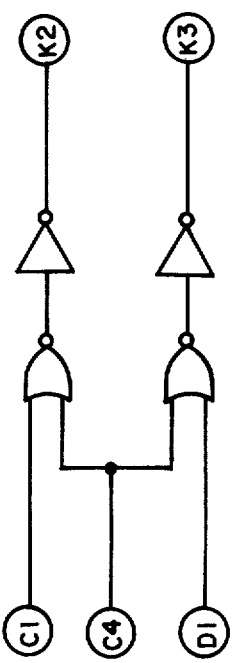
FIG. 6E
FIG. 6F

DRUM CHARACTER PATTERN

↓ COLUMN NUMBER →

| | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| 15 | T | Y | T | Y | / | . | . | / | . | . | . | . | . | F | T | Z | V | F | F | F | F |
| 14 | S | X | S | T | N | T | E | E | − | − | U | T | M | E | S | W | U | E | E | E | E |
| 13 | R | W | P | R | T | M | D | D | + | + | L | R | L | D | R | T | T | D | D | D | D |
| 12 | P | V | I | O | S | L | C | C | C | C | C | O | G | C | P | S | R | C | C | C | C |
| 11 | O | U | F | L | P | D | B | B | B | B | B | N | E | B | O | P | Q | B | B | B | B |
| 10 | N | T | A | A | C | A | A | A | A | A | A | B | A | M | O | O | A | A | A | A | A |
| 9 | M | S | 9 | 9 | 9 | 9 | 9 | 9 | 9 | 9 | 9 | 9 | 9 | K | N | N | 9 | 9 | 9 | 9 | 9 |
| 8 | L | R | 8 | 8 | 8 | 8 | 8 | 8 | 8 | 8 | 8 | 8 | 8 | I | M | M | 8 | 8 | 8 | 8 | 8 |
| 7 | H | N | 7 | 7 | 7 | 7 | 7 | 7 | 7 | 7 | 7 | 7 | 7 | H | L | I | 7 | 7 | 7 | 7 | 7 |
| 6 | G | L | 6 | 6 | 6 | 6 | 6 | 6 | 6 | 6 | 6 | 6 | 6 | G | K | H | 6 | 6 | 6 | 6 | 6 |
| 5 | F | F | 5 | 5 | 5 | 5 | 5 | 5 | 5 | 5 | 5 | 5 | 5 | F | I | G | 5 | 5 | 5 | 5 | 5 |
| 4 | E | E | 4 | 4 | 4 | 4 | 4 | 4 | 4 | 4 | 4 | 4 | 4 | E | F | F | 4 | 4 | 4 | 4 | 4 |
| 3 | D | D | 3 | 3 | 3 | 3 | 3 | 3 | 3 | 3 | 3 | 3 | 3 | D | E | D | 3 | 3 | 3 | 3 | 3 |
| 2 | C | C | 2 | 2 | 2 | 2 | 2 | 2 | 2 | 2 | 2 | 2 | 2 | C | J | C | 2 | 2 | 2 | 2 | 2 |
| 1 | B | B | 1 | 1 | 1 | 1 | 1 | 1 | 1 | 1 | 1 | 1 | 1 | B | C | B | 1 | 1 | 1 | 1 | 1 |
| 0 | A | A | 0 | 0 | 0 | 0 | 0 | 0 | 0 | 0 | 0 | 0 | 0 | A | A | A | 0 | 0 | 0 | 0 | 0 |

FIG. 9

PRINTER CONTROL SYSTEM

BACKGROUND OF THE INVENTION

The present invention relates to a control system for a printer and is especially useful for controlling the printing of data by a rotary drum printer.

Prior art communication systems, for example controlling the environment within a building or fire and security conditions within a building, having a central panel for providing alarm indications or indications of the status of various points within the building, originally provided a separate wire running from the panel to each point which was being monitored. In today's large buildings, however, the costs of wiring in this manner can be prohibitive. Therefore, the prior art replaced these plurality of wires by a single transmission channel running from the central processing unit to the remote points being monitored.

The central processing unit is capable of scanning the status of the various remote points and controlling various operations at the remote points by addressing in turn each remote point and requiring the remote points to take some action. The action may be to report back its present status, such as temperature, pressue or humidity, or to perform some operation such as starting or stopping a fan, opening a damper or whatever. By using a single transmission channel, the cost of installation of these monitoring systems is greatly reduced.

Such communication systems must perform a variety of services other than scanning and performing operations at remote points. Indications of the status of the remote points must be given and recorded which function is often performed by printers. In a typical system the printer will print out any changes in status of the remote points. It is also desirable for the printer to print logs of the status or occurrences at the remote points. In the present invention, the printer has access to the central processor to request the transmission of certain data so that the printer can print it. The printer used in the present invention is a rotary drum printer.

Such rotary drum printers have a printing drum with characters arranged in a plurality of columns and rows. Paper is fed between this drum and a plurality of firing hammers, each hammer associated with a corresponding column of characters and the printing operating is accomplished by firing a hammer which strikes the paper to the character leaving imprinted on the paper the character on the drum associated with that hammer.

Data to be printed which is transmitted by a central processor typically comprises a plurality of bits and the bits are divided into groups of four or five, each group representing a character to be printed. The data is transmitted, usually, a line at a time. A plurality of bits, comprising a plurality of characters, are supplied to the printer which stores them and then pulls out the data bits, a character at a time, for comparison with the present drum position of the printer. Each character to be printed corresponds to a particular character in a particular column on the drum. If the drum presents its first row of characters to the hammers, only certain stored characters will correspond to the characters in that row. Thus, only those hammers relating to the characters in the row which match the stored characters will be fired.

The drum revolves to a new row after the hammers have been fired at the first row. The stored characters are compared with the new drum position and new corresponding hammers are fired. This operation continues until all rows have been compared with the stored characters. As the last row is compared, the entire line will have been printed and the printer can print a new line of data from the central processor.

Since all data characters must be compared with each drum position and since only a character at a time is compared, some means must be provided for keeping any matches until all stored characters have been compared with the drum row position at which time all hammers corresponding to the matches may be fired in unison. The prior art apparatus have typically used a series of gates connected to the output of the comparator and to a distributor for selecting which gate is to pass the comparator output and a series of latches, each associated with a column on the printer drum for storing the output from the comparator through the series of gates. As can be seen, this prior art apparatus is extremely complex requiring the employment of a considerable amount of logic circuitry.

The present invention simplifies the control apparatus and reduces the amount of logic circuitry needed by shifting the output from the comparator through a shift register which automatically keeps track of the data characters compared by the comparator and their associated column position on the printer drum. When all of the data characters have been compared with the drum position, a signal is generated which allows the output from the shift register to be transmitted to the firing circuitry for firing the associated hammers of the printer.

In addition, the prior art systems have not provided a printing control system which can both receive data to be printed and, while data is being received, print data which has previously been received in a manner as simple as that provided by the instant invention. To accomplish this operation, the present invention uses a random access memory with a write addressor for storing incoming data in one half of the RAM and a read addressor for reading out and printing data stored in the other half of the RAM. The control system includes a mechanism for controlling the highest order storage bit location of the RAM which divides the RAM in half so that one half can store data and the other half can provide data to the printer for printing.

SUMMARY OF THE INVENTION

A storage means is provided for receiving data from a central processor which data is divided by bits into characters to be printed. A comparator compares this data a character at a time with the position of the drum and provides a match output when there is a match and a non-match output when there is no match between the character and the drum position to a shift register. Each character stored in the memory is compared in this manner and the outputs from the comparator are shifted through the shift register until each character has been compared. When all stored characters have been compared to the drum position, the outputs from the shift register are supplied to corresponding hammers for printing the characters. The comparison is executed again at the next drum row position and appropriate hammers are again fired. This operation is continued until each drum position corresponding to a row of characters has been compared with the data and an entire line is printed.

The memory for storing the data is a random access memory which is divided into halves by controlling the highest order storage bit location such that data can be stored in one half while the data in the other half is compared with each drum position and the printing operation is performed. At the end of the printing operation, the highest order bit is again controlled for switching the reading and writing operations with respect to the two halves of the random access memory.

BRIEF DESCRIPTION OF THE DRAWINGS

These and other features of the invention will become apparent from a review of the drawings in which:

FIG. 1 is a block diagram showing the central processing unit and the remote stations;

FIG. 2 shows the data transmission of words between the central processing unit and the remote stations of FIG. 1;

FIG. 3 shows an address word made up of a plurality of bits;

FIG. 4 shows a data word made up of a plurality of bits;

FIGS. 6A–6G show the details of the printer control circuit shown in FIG. 1;

FIG. 9 shows the character geography of a drum of a typical rotary drum printer.

DETAILED DESCRIPTION OF THE DRAWINGS

Figure 5A:
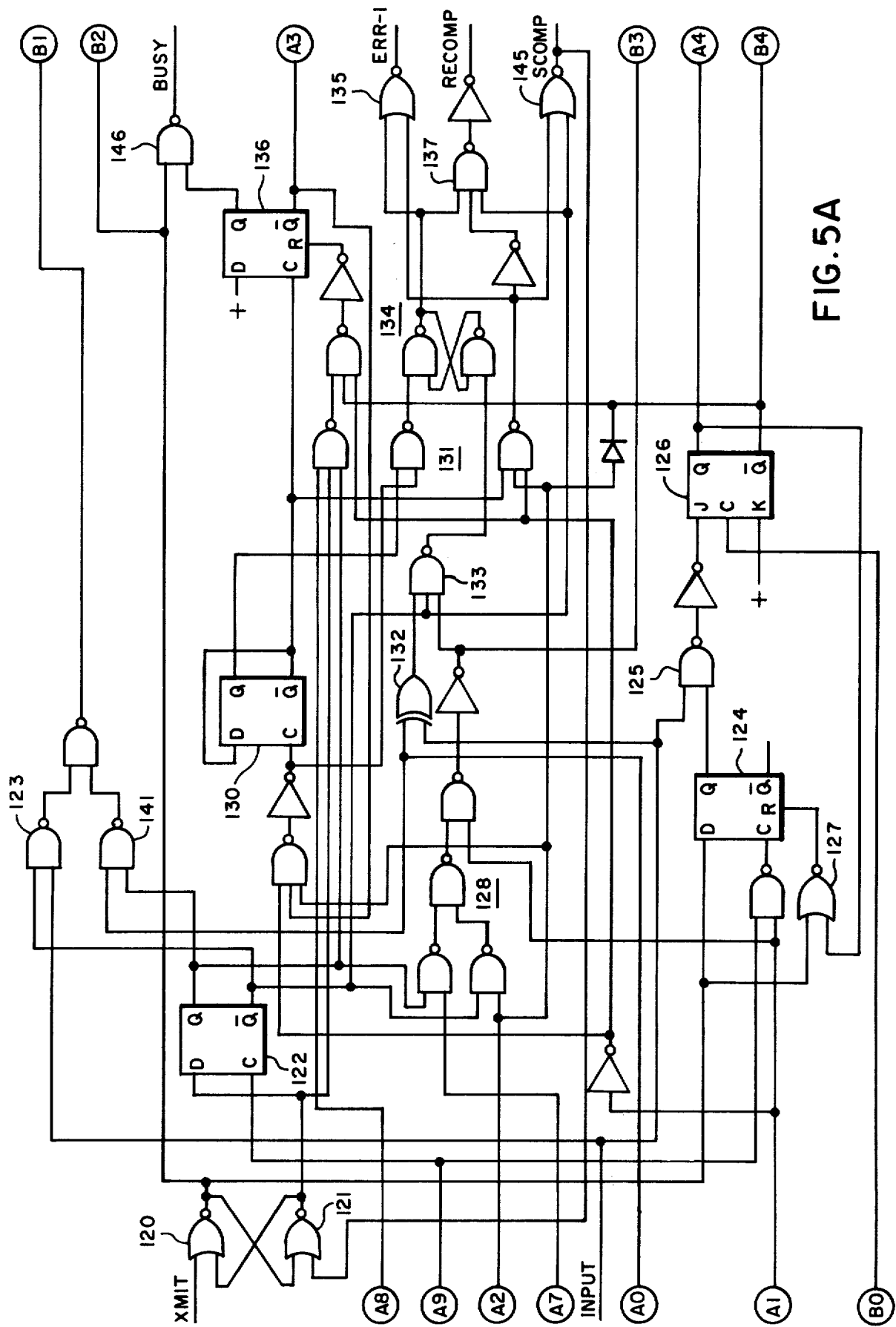
FIGS. 5–5E show the universal asynchronous receiver transmitter at the CPU and each of the printers.

The general communication system is shown in FIG. 1 and comprises a central processing unit 100 having a universal asynchronous receiver transmitter 101 for transmitting and receiving messages over a transmission channel 103 and a microprocessor 102 for providing the addressing and control functions of the central processing unit. The communication channel 103 is also connected to a plurality of remote stations which are shown as printer controls. Specifically, three printers have been shown, each comprising a universal asynchronous receiver transmitter 104 and a printer control 105. The Universal Asynchronous Receiver Transmitter 101 and 104 are the same apparatus that are shown in more detail in FIGS. 5–5E. The microprocessor can be the National Semiconductor, Inc. IMP 16C model.

The central processing unit 100 communicates with the printers by transmitting messages over the transmission line 103, a representative sample of the messages being shown in FIG. 2. The central processor, when data is to be printed by selected printers, first transmits the address words for the selected printers. As shown in FIG. 2, all three printers are addressed and all will, therefore, receive and store the data transmitted by the central processing unit in a single stream of data transmission. A single transmission may be the sending of data only once or may be the sending of the data in a first half of the transmission and sending the data again in a second half of the transmission for error checking. After all data is received by the selected printers, a further selected printer may transmit back the last data word as a handshake feature to indicate that all data has been received without error.

An address word takes the form of FIG. 3. The first and last two bits which are unnumbered are the start and stop bits respectively. Bits 1 and 2 indicate whether the word is an address word or a data word. Bits 3 and 12 indicate whether the remote station is being polled for information, whether a handshake feature is to be provided or whether a handshake feature is not to be provided. For polling, bits 3 and 12 are set with a 0 which indicates to the printer control that it should transmit back any information it may have. For the provision of a handshake signal, bits 3 and 12 are provided with a 1 which requires the printer receiving an address word with bits 3 and 12 set with a 1 to transmit back the last word received. When the remote station receives a polling address word from the central processing unit, the remote station scans its status switches and, if no switch has been set, the remote station sends back the address word to the central processing unit which informs this unit that the remote station has no status information to report. If one of these bits is a 1 and the other is a 0, no handshake will be provided. Bits 4 through 7 are the tens digit for the address and bits 8 through 11 are the units digit for the address.

A data word is shown in FIG. 4. Bits 1 and 2 again are to inform the remote station whether the word is an address word or a data word. Bit 2 provides a directive flag which informs the printer control unit that the data word having a 1 set therein is the last data word in that transmission. Bits 3 through 7 form one character of data transmitted and bits 8 through 12 form a second character of data transmitted. As many data words may be transmitted as are capable of being stored by the printer control.

The circuits within each printer control circuit and Universal Asynchronous Receiver Transmitter circuit at the remote stations are the same and, therefore, only one is shown in detail in the subsequent figures. FIG. 5 shows a generalized block diagram for the universal asynchronous receiver transmitters 101 and 104 shown in FIG. 1. The Universal Asynchronous Receiver Transmitter is driven by a master clock which drives the various clock generators for providing the timing signals necessary for operating the Universal Asynchronous Receiver Transmitter. The output from master clock 106 drives three phase clock 107 which produces three outputs for generating timing signals for the rest of the circuit. The input data received over transmission line 103 is fed through input and error checking circuit 108 and stored in shift register 109 under the control of the three phase clock and is shifted out of the shift register back into input and error checking circuit 108 which checks the first half of the transmission of the message on line 103 with the second half of the transmission bit by bit. The error checking is accomplished under the control of counter 110 which counts the number of bits within a message for controlling the error checking done by circuit 108. When the error checking operation is completed, the message is then provided at the otput of the shift register. The output actually comprises a plurality of lines. Any message provided by a load 111, which may be a remote station in the form of a printer control, security or fire monitoring station or environmental control station, can provide an input to the shift register 109 for sending data back out over the transmission channel 103 to the central processing unit.

The specific apparatus within the general boxes is shown in more detail in FIGS. 5A–5E. The terminals A0–A9 and B0–B4 show how these circuits are interconnected. The attached Appendix may be referred to for a functional description of each terminal.

Figures 5B, 5C:
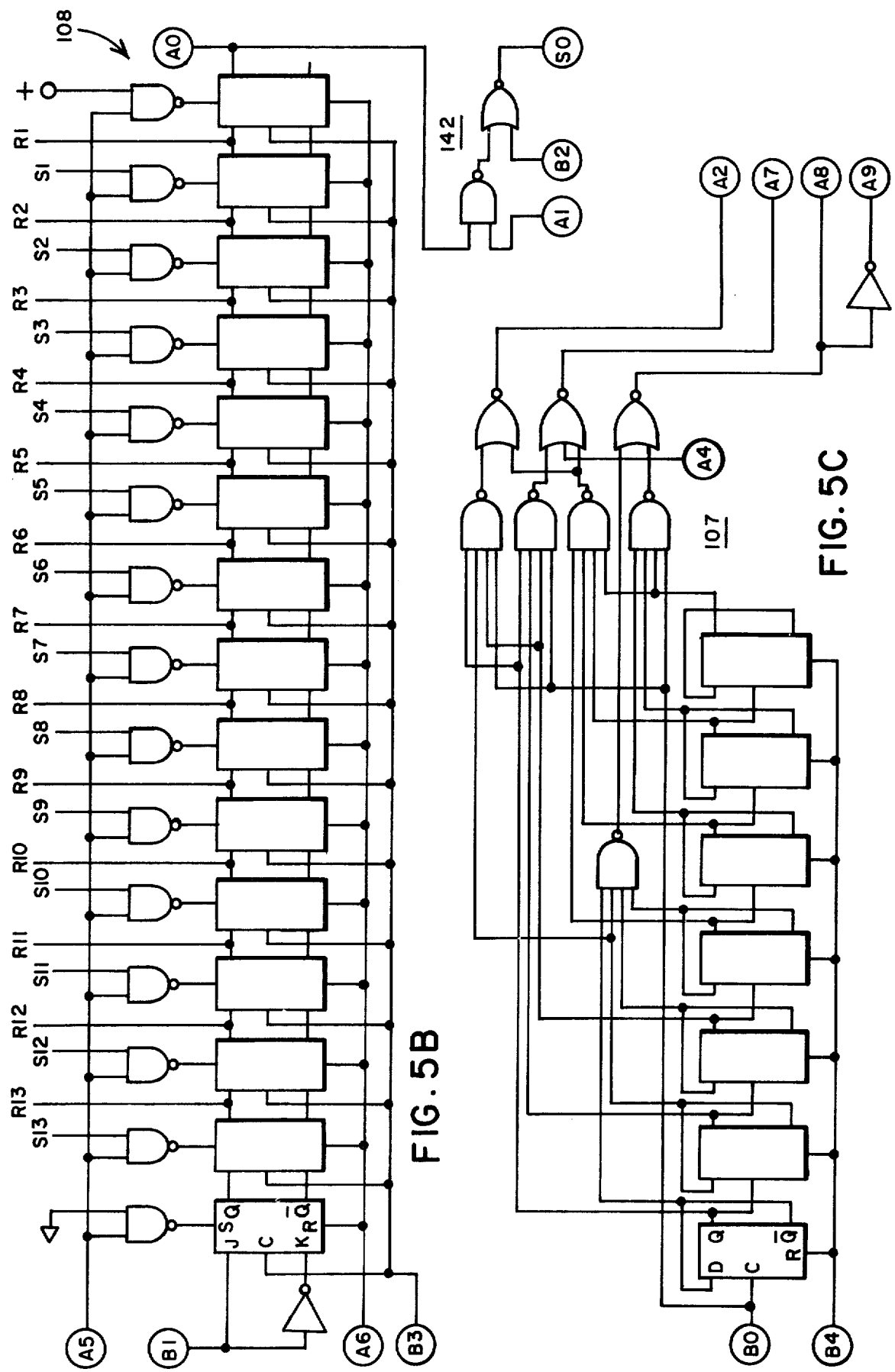

During standby conditions, when the Universal Asynchronous Receiver Transmitter is in a condition to receive input data over the transmission line, transmit flip-flop 120–121 in FIG. 5A is in a condition where the output from NOR gate 120 is 1 and the output from NOR gate 121 is 0. The mode flip-flop 122 is reset to allow any incoming data to pass through NAND gate 123 to terminal B1 for shifting through the shift register shown in FIG. 5B.

The master clock 106 provides an input at terminal B0 to the three phase clock 107 which produces its output at terminals A2, A7, A8, and A9 for controlling the timing of the circuit of FIG. 5A and for driving the count of 15 counter 110 of FIG. 5D. Moreover, the 0 output from NOR gate 120 is clocked by D flip-flop 124 to the input of NAND gate 125.

Upon receipt of the first message over the transmission line, the first message is received on the input terminal of the circuit shown in FIG. 5A and the start bit of the message is transmitted through NAND gate 125 to the J terminal of J flip-flop 126 which is clocked by the output by the master clock 106. The outputs from the J flop 126 are presented on terminals A4 and B4 for resetting the count of 15 counter 110 and the three phase clock 107. The Q output from flip-flop 126 is also connected through NOR gate 127 to reset the D flip-flop 124 to prevent any further bits from being transmitted through the NAND gate 125.

The incoming message is also supplied to the NAND gate 123 and is transmitted therethrough to terminal B1 for storing in the shift register 108. The input data word is shifted through the shift register 108 under the control of logic circuitry 128 which provides an output at terminal B3 dependent upon the three phase clock 107 which has inputs to the logic circuitry 128 at terminals A2 and A7.

As the incoming message is shifted through shift register 108, the count of 15 counter 110 is, in effect, counting the bits of the message and when a count of 15 is reached it produces an output on terminal A1 which clocks the 0 from NOR gate 120 through D flip-flop 124 to condition NAND gate 125 to receive another message on the input, momentarily inhibits logic circuitry 128 from supplying any further pulses to the clock terminals of shift register 108 and operates the half cycle flip-flop 130 to reverse its Q and $\overline{Q}$ outputs. When the half cycle flip-flop 130 operates, it conditions logic circuitry 131 to provide the ERR-1 (error), RECOMP (receive complete), and/or SCOMP (send complete) signals upon the completion of the error checking cycle.

The error checking cycle is begun as the count of 15 counter 110 begins its next count of 15. The information which was stored in the shift register 108 is clocked out under the control of logic circuitry 128 and presented at terminal A0 to comparator EXCLUSIVE OR gate 132. The other side of the EXCLUSIVE OR gate receives the second half of the transmission from the input line and compares the second half of the transmission with the first half of the transmission stored in shift register 108 bit by bit. At the same time, the second half of the transmission is supplied through NAND gate 123 and shifted into the shift register 108 as the first half of the transmission is shifted out. If there is an error in transmission, i.e. a bit of the first half of the transmission and the second half of the transmission do not match, gate 132 provides an output through NAND gate 133 to Error Latch 134 to provide an error in transmission, the second count of 15 output from count 15 counter 110 operates flip-flop 130 to provide a clock signal to stop flip-flop 136 and to operate logic circuitry 131 to provide an output to NAND gate 137 which produces a receive complete signal. When the stop flip-flop 136 operates, it provides an output to the NAND gate 138 of the count of 15 counter 110 to inhibit any further clocking signals from the three phase clock at terminal A2. Thus the output terminal A1 is maintained at a state which prohibits the logic circuitry 128 from producing any further clocking signal to the shift register 108. The messge which was transmitted is stored in shift register 108 and appears at terminals R1–R13 as an output from the Universal Asynchronous Receiver Transmitter. The error signal from NOR gate 135 also provides an output from the Universal Asynchronous Receiver Transmitter as does the receive complete line. The Universal Asynchronous Receiver Transmitter is now in a condition to receive any further messages transmitted to its input.

If the remote station or central processing unit associated with the Universal Asynchronous Receiver Transmitter has any information to transmit, the remote station or central processing unit provides both a transmit pulse to NOR gate 120 and a load pulse to the input of the circuit shown in FIG. 5E. The load pulse triggers a one shot circuit 140 which provides an output to terminal A6 which clears the shift register 108 and also produces an output at terminal A5 which loads in the message to be transmitted appearing on terminals S1–S13 of the shift register 108 through associated NAND gates. When NOR gates 120 and 121 reverse their outputs, the 0 at the output from NOR gate 120 is clocked through D flip-flop 124 to disable the receive logic. Also, mode flip-flop 122 is operated to condition NAND gate 141 to shift the message in shift register 108 back into the register 108 while it is being shifted out on the transmission line. As the logic circuitry 128 is providing the clocking pulses to the shift register 108, the message stored in register 108 is shifted out at terminal A0 and is also shifted out through send logic circuitry 142 which has been conditioned to transmit the pulses at terminal A0 by an input from terminal B2 which is connected to the output at NOR gate 120. The message shifted through the logic circuitry 142 is supplied to the transmission line and is also supplied to terminal !0 of FIG. 5A which is connected through NAND gate 141 to the input of the shift register. As the first half of the transmission is completed, the count of 15 counter 110 provides an output which triggers half mode flip-flop 130 to condition stop flip-flop 136 to stop the transmission after the second half of the transmission. As the message is clocked out on the line a second time, the count of 15 counter 110 will provide an output at the end of the second half of the transmission which prevents logic circuitry 128 from providing any more clocking signals to the shift register 108. The count of 15 counter ceases operation due to the output from stop flip-flop 136 on terminal A3 which inhibits any further three phase clock pulses from being supplied to the clocking terminal of count of 15 counter 110. At the same time, an input is supplied to NOR gate 145 which provides a send complete signal and which also resets the transmit latch 120–121.

When originally latch 120–121 is set indicating that the Universal Asynchronous Receiver Transmitter is in a transmitting mode, an output is supplied through NAND gate 146 which is a busy signal to inform the central processing unit or the remote station that the Universal Asynchronous Receiver Transmitter is busy transmitting data. The output from NOR gate 145 resets the transmit latch 120–121 and the Universal Asynchronous Receiver Transmitter is now in a condition to either transmit or receive messages.

Figure 6:
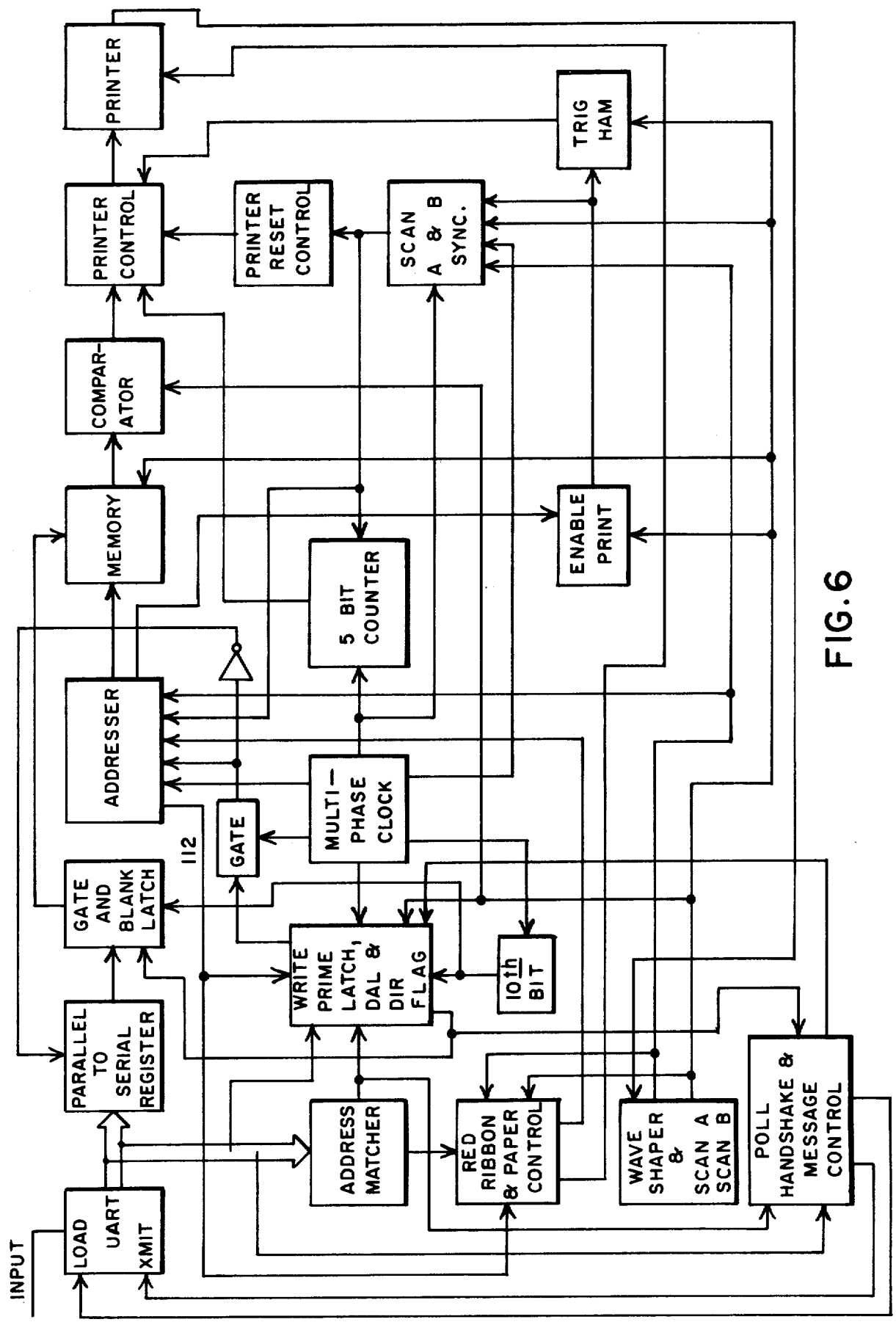
FIG. 6 shows a general block diagram of the printer controls shown in FIG. 1.

The Universal Asynchronous Receiver Transmitter shown in FIGS. 5–5E provides for receiving and transmitting messages to and from both the central processing unit and the remote station. When the remote station is a printer, FIG. 6 shows how the UART is connected to a generalized block diagram of a printer control circuit. When the central processing unit desires a printer to print out data, it first addresses the printer by sending an address word over the transmission channel which word is received at the input to the Universal Asynchronous Receiver Transmitter. The Universal Asynchronous Receiver Transmitter presents this address word over its 13-bit output bus to an address matcher which compares the address of the message stored in the Universal Asynchronous Receiver Transmitter with the address field associated with that particular printer.

If there is a match, the address matcher provides an output through the poll, handshake and message control circuit which looks at bits 3 and 12 of the output from the UART to determine if the messge indicates a desire for a status report or for printout of data and, if so, whether a handshake is to be provided. If the status of its switches are desired (polling) and at least one switch has been operated, the poll, handshake and message control circuit provides both a load signal which loads into the Universal Asynchronous Receiver Transmitter the status of the switches and a transmit pulse which transmits this status back to the central processing unit. If no switch has been operated, only a transmit pulse is generated returning the address word back to the CPU. If the address word does not contain a poll command, the message sets the write prime latch of the write prime latch, DAL and directive flag circuit and, if a handshake is to be provided, the handshake latch in the poll, handshake and message control circuit is operated.

With the write prime latch set, the printer control circuitry is now in a condition to receive data out of the Universal Asynchronous Receiver Transmitter and begin the printing operation. As soon as the data word is received and appears at the output of the Universal Asynchronous Receiver Transmitter, the data available latch (DAL) is set and the word is loaded into the parallel to serial register for shifting into the memory. Under the control of the scan A and scan B outputs from the wave shaper and scan A and scan B sync circuit and the multi-phase clock, the addresser is incremented to write into the memory circuit the output from the parallel to serial register. The last data word of the data to be printed carries a directive flag bit. When this bit is received, it provides an output to the poll, handshake and message control circuit to transmit back, if the handshake latch has been set, the last word received to inform the central processing unit that all data words have been received without error.

At the same time, if all 112 storage locations in one half of the memory have not yet been filled, the gate and blank latch fills the rest of the storage locations with blanks until the count of 112 is produced. When all storage locations have been filled, the addresser produces a count of 112 signal which clears the write prime latch, data available latch and directive flag logic circuitry, and provides an output to the red ribbon and paper control circuit to insure that, if the red ribbon is to be used, it is properly latched in. When the red ribbon is latched or if it is not to be used, an output is provided to the addresser circuit which provides an output to the enable print circuit to begin the printing operation. At the same time, the circuit, when in a printing mode, can also receive additional data from the UART to be stored in the other half of the memory.

Under the control of the multi-phase clock, the addresser then takes the messages stored in the memory out to the comparator which compares, under the control of the scan B signal, the data in the memory with the position of the drum of the printer. Under the control of the five bit counter, the information is shifted out of the memory to the comparator five bits at a time. Each character to be printed comprises five bits. Any matches between the five bits, which represent a character to be printed, with the drum position is supplied to the printer control circuit. The printer control circuit keeps track of the match signals and the column position with respect to each character which is being compared with the drum position. All of the characters stored in the memory are, in this manner, compared with the drum position and at the end of the comparison and under the control of the scan B signal and the enable print circuit, the printer control circuit receives an output from the trigger hammer circuit to fire all of the hammers which correspond to the matches in signals between the characters stored in the memory and those on the drum. The printer drum next advances to the next row of characters and the comparison process is performed again where the new row of characters is compared with the characters stored in the memory and this process is repeated until all of the rows of the printer drum have been compared with the data stored in the memory. When this process has been completed, the ribbon and paper control circuit shifts the paper through the printer and the data stored in the other half of the memory can now be printed.

As the data stored in the second half of the memory is then printed, the first half of the memory, which stored the data printed during the first operation, can now be rewritten.

FIGS. 6A–6G show the detail of the printer control circuits shown generally in FIG. 1. For a clearer understanding of the printer control circuits and its operation, the flow chart in FIG. 7 may be referred to along with the timing chart of FIG. 8.

FIG. 9 is a map of characters on a typical drum of a rotary drum printer. There are 21 columns of characters arranged in 16 rows. The data which is transmitted to the printer for printing is sent by data words comprising two characters each, each character comprising five bits. The characters are transmitted in order depending upon the column in which they are to be printed.

Assume the printing operation begins as the hammers of the printer are positioned over row 8. The data stored in the memory is supplied to the comparator a character at a time. The characters are compared to an output of a drum trace circuit which output corresponds to row 8. First character 1 is compared and, if there is a match, a 1 is stored in a shift register. Character 2 is then compared and a 1 for a match or a 0 for a non-match is stored and is shifted into the register and so on until all characters have been compared. When the register is full, a match for character 1 appears at the register output associated with column 1 and all other 1's and 0's appear at the appropriate column outputs of the register. The hammers associated with the 1 outputs are fired and the matched characters are printed.

The printer rotates to row 9 and the stored characters are next compared to row 9 by incrementing the drum trace circuit. Rows 10–15 and 0–7 are subsequently compared and suitable hammers are fired for each row. At the end of the row 7 comparison, the entire line of characters stored in the memory will have been printed and the printer can now begin printing the second line.

Figure 6A:
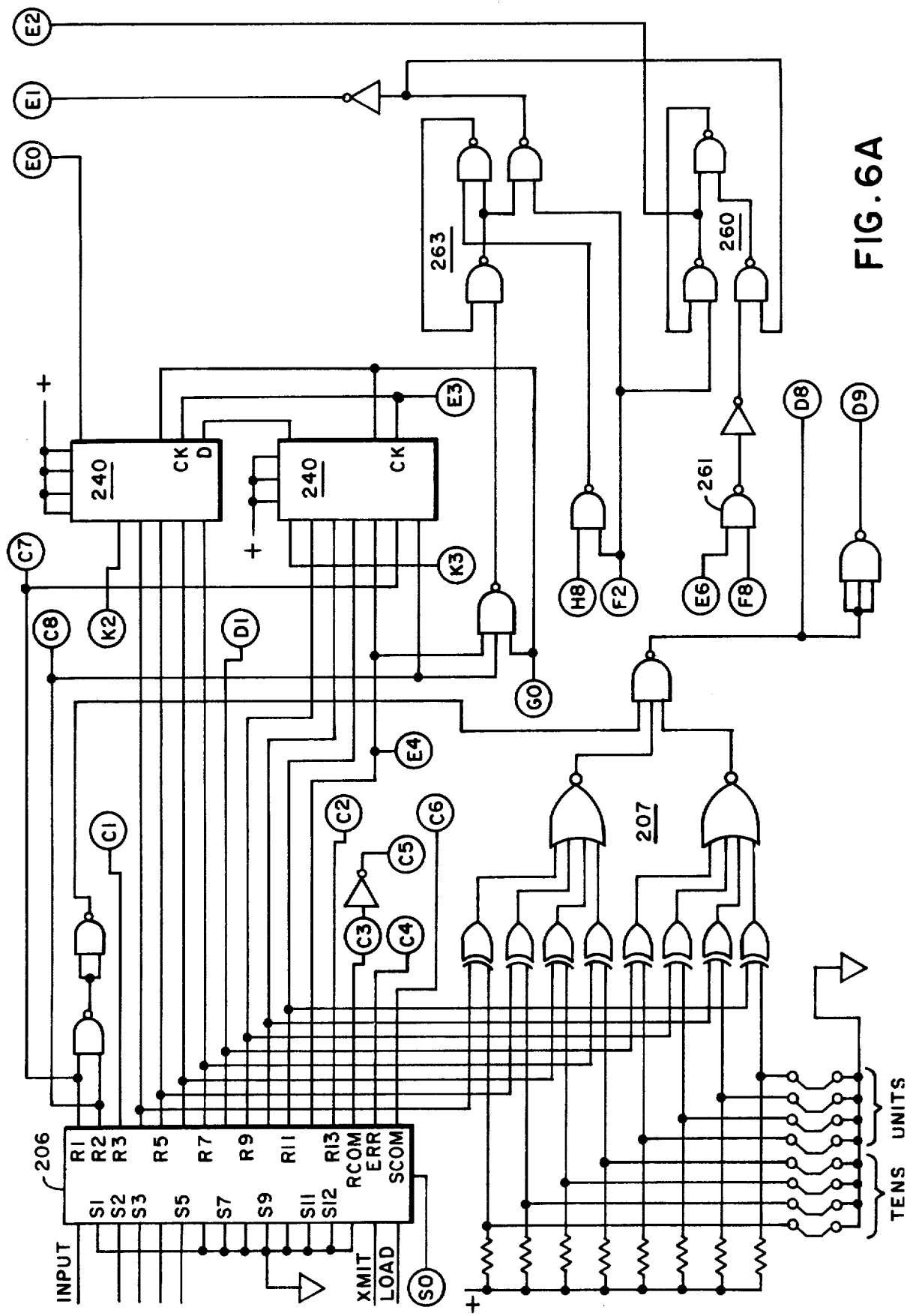
Figure 6B:
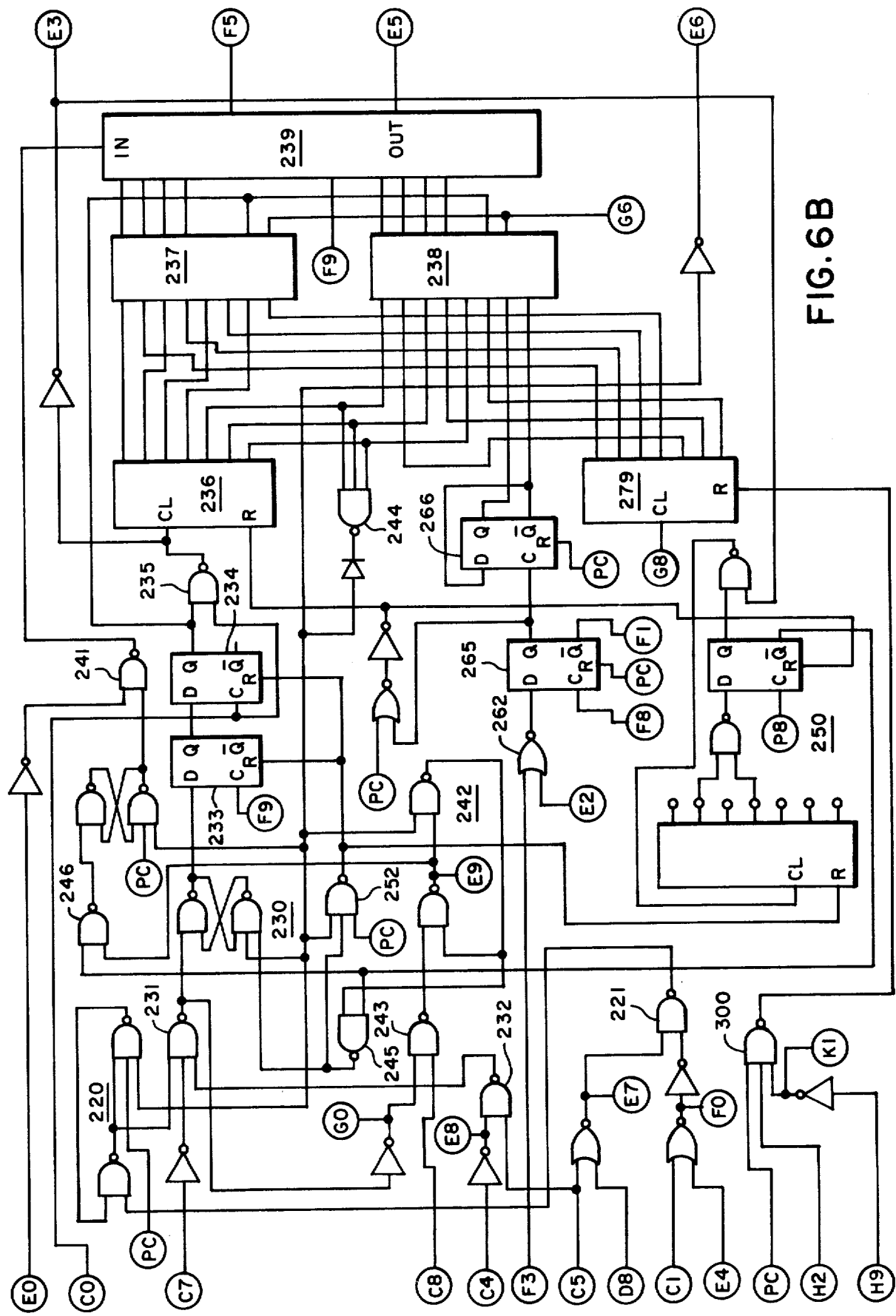
Figure 6C:
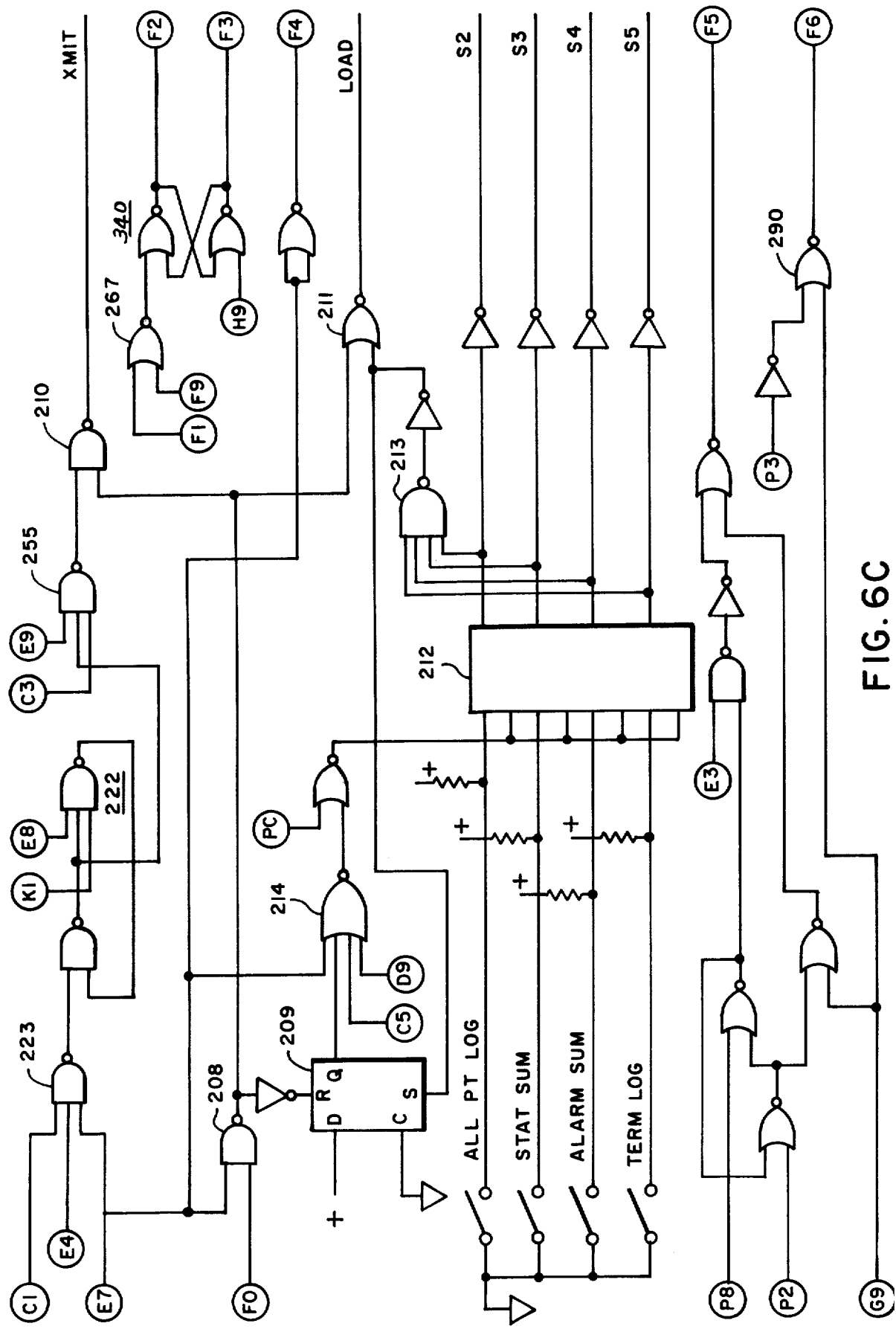
Figure 6D:
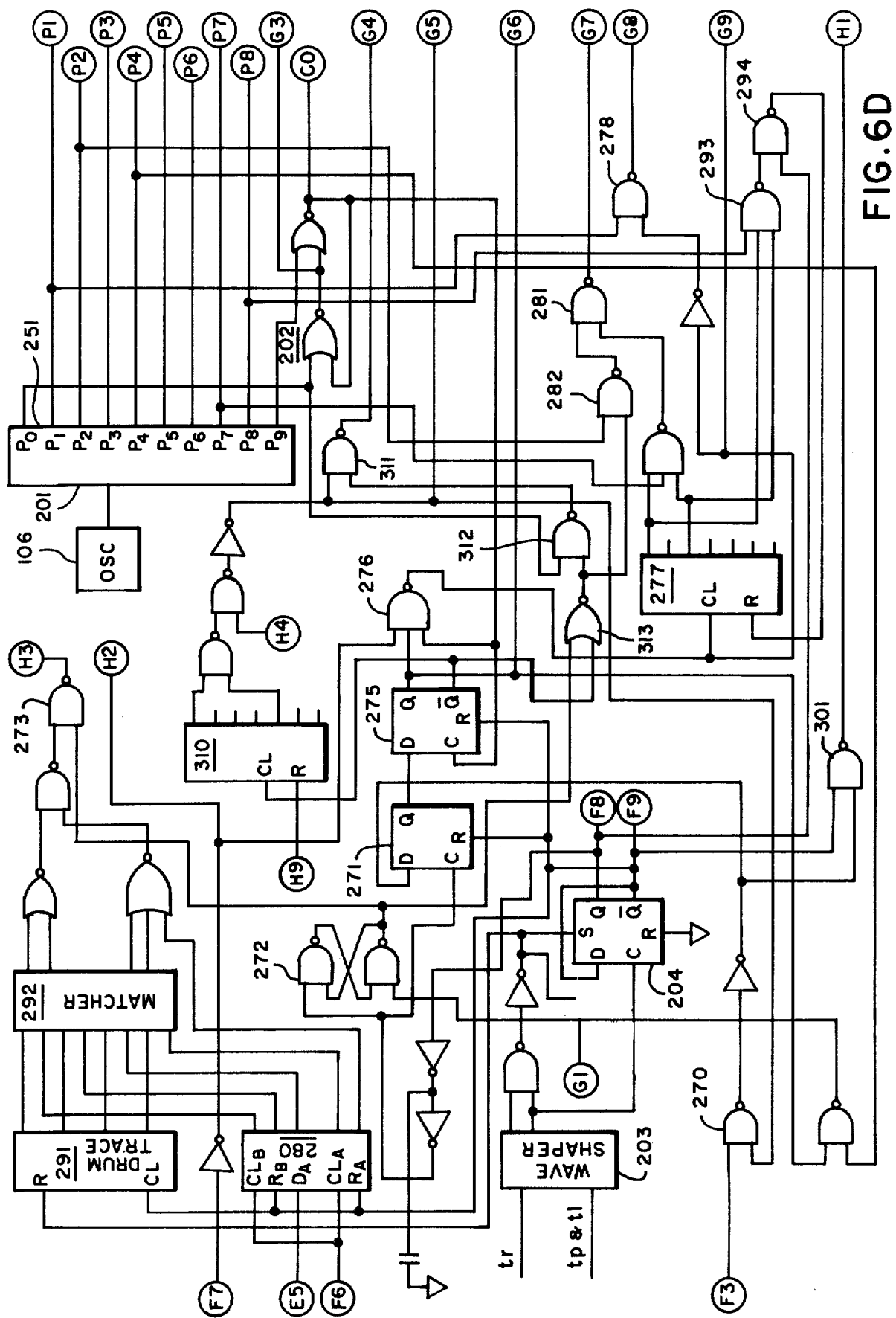

The timing chart of FIG. 9 shows the output signals from the multi-phase clock 201 shown in FIG. 6D. The output C0 is provided by logic circuitry 202 connected to the multi-phase clock. The multi-phase clock 201 is driven by the master oscillator 106. The outputs from the multi-phase clock control the timing of the printer control circuit.

One printer that can be used with this printer control circuit is the Seiko EP-101 Printer. This printer puts out a pulse tr per revolution of the drum and puts out pulses *tp* and *tl* which represent each row of characters on the printing drum. In order to print a complete line of data or information, it can be seen that it is necessary to rotate the drum one complete revolution. The pulses *tr* are generated once per revolution but there are 16 *tp* and *tl* pulses generated per revolution one set of pulses for each row of characters on the printing drum. These pulses are supplied to a wave shaper circuit 203, FIG. 6D, which has its outputs connected to logic circuitry for controlling a D flip-flop 204 which provides the scan A and scan B pulses shown at the bottom of FIG. 8 at terminals F8 and F9. The character matching operation is performed during a scan A pulse and the writing operation into the memory is done during the scan B pulse time. Together, the outputs from the multi-phase clock and the scan A and scan B pulses control the timing of the circuit.

The incoming message is supplied at the input to the Universal Asynchronous Receiver Transmitter 206 shown in FIG. 6A. This Universal Asynchronous Receiver Transmitter is the same circuit as that shown in FIG. 5–5E and has been reshown in a simplified form for purposes of explanation of its operation with the associated printing control circuit. The message then is presented at outputs R1–R13 of the Universal Asynchronous Receiver Transmitter and the received complete signal, the error signal and the send complete signal are also supplied at appropriate output terminals. When an incoming address word is received, each remote station checks the address against its own address field to see if it is being addressed by the central processing unit. The address portion of an address word is provided by bits 4–11 which outputs from the Universal Asynchronous Receiver Transmitter are connected to one set of inputs of an address match circuit 207 the other set of inputs of which are connected to the tens and units straps of an address strap field. Designated ones of these straps ae omitted and others are included to establish an address and identify each remote station. If the remote station shown in FIG. 6A has not been addressed by the central processing unit, nothing further happens in the control circuit and it then waits for a signal or an address word having its address. The FIG. 7 flow chart and the attached Appendix identifying each terminal will help in following the operation. If, however, the remote station shown in FIG. 6A has received its address, but there is an error in transmission, the remote station does nothing further and waits for another attempt by the central processor to address it. If no error has occurred, the receive complete signal is generated at output terminal C5.

The printer control circuit next checks to see whether the address word merely requests a polling of the status switches of the station. In the case of a printer control circuit, the status switches are shown in FIG. 6C and include switches which provide inputs to the Universal Asynchronous Receiver Transmitter for transmission to the central processing unit requiring the central processing unit to provide an all points log, a status summary, an alarm summary or to terminate a log printout.

Figure 7A:
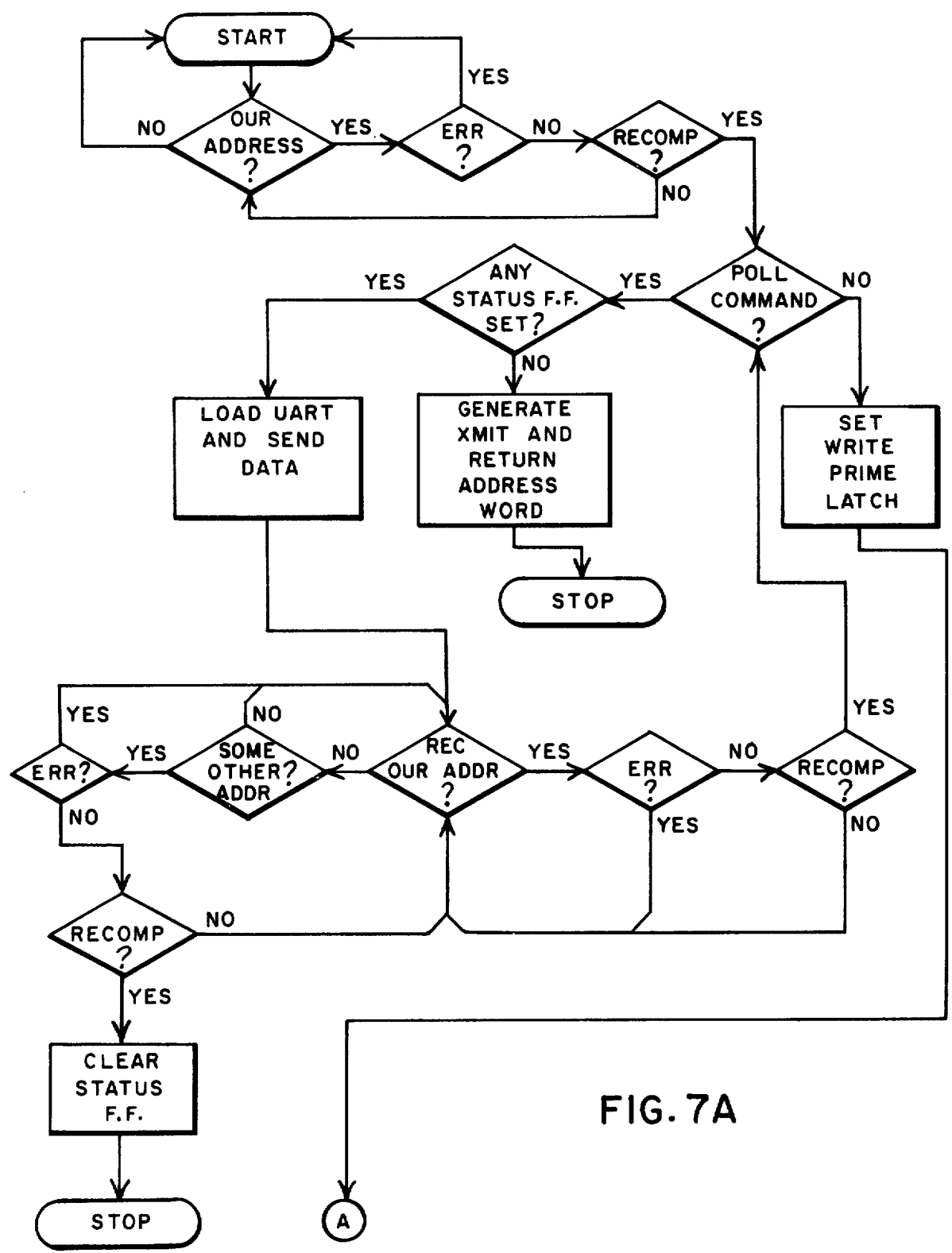
FIGS. 7A–7E show a flow chart of the operation of the printer control circuit.
Figure 7B:
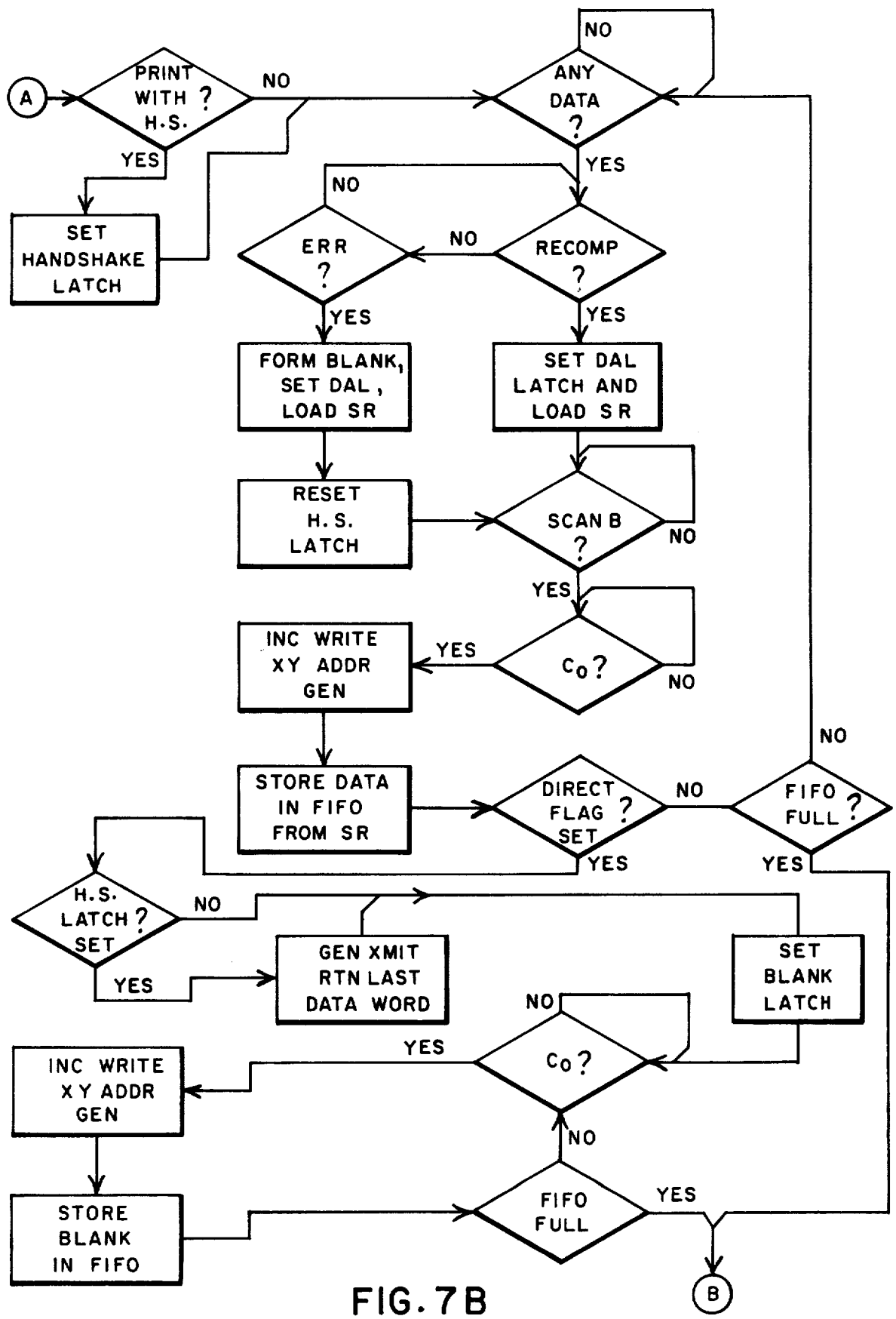
Figure 7C:
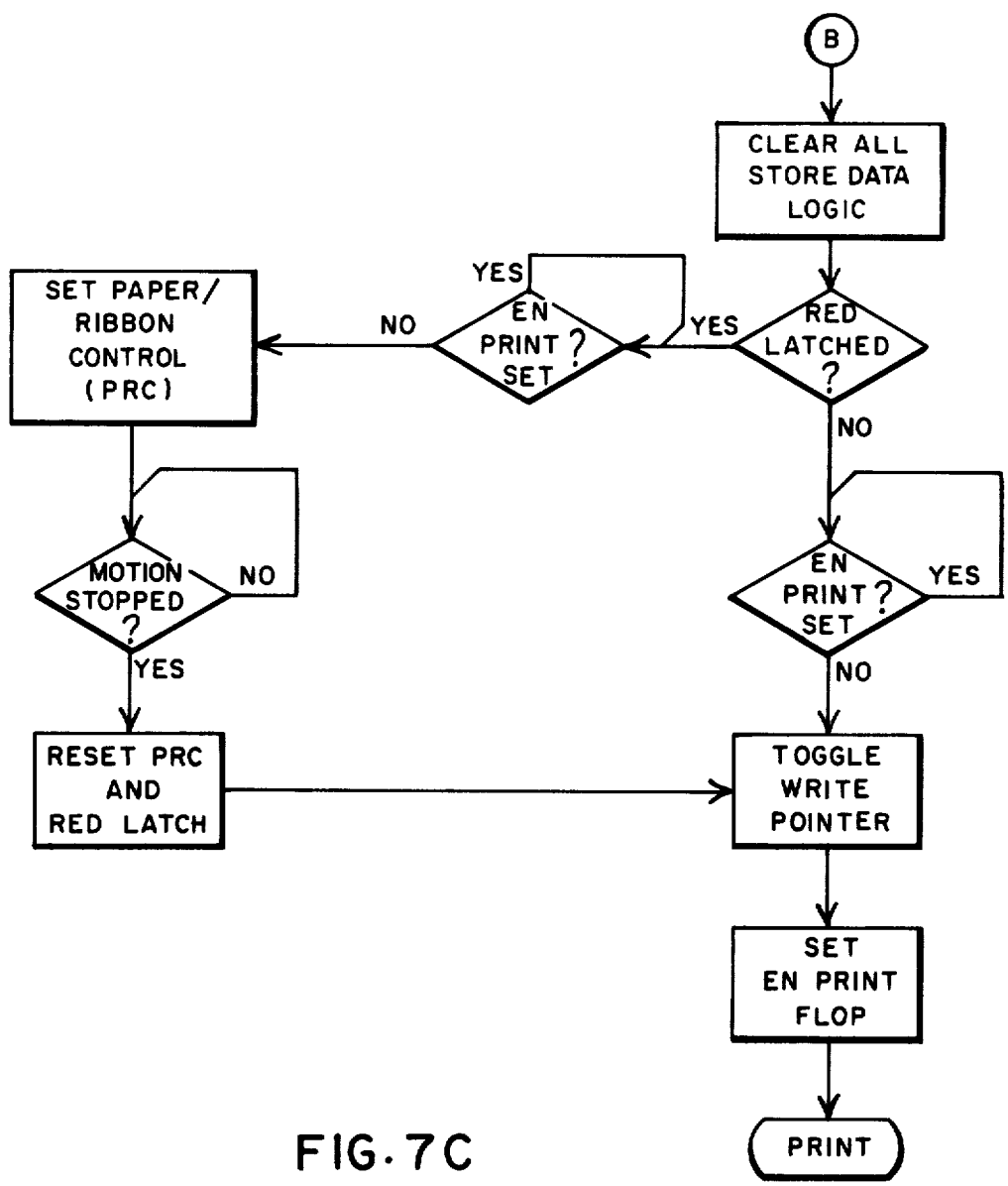
Figure 7D:
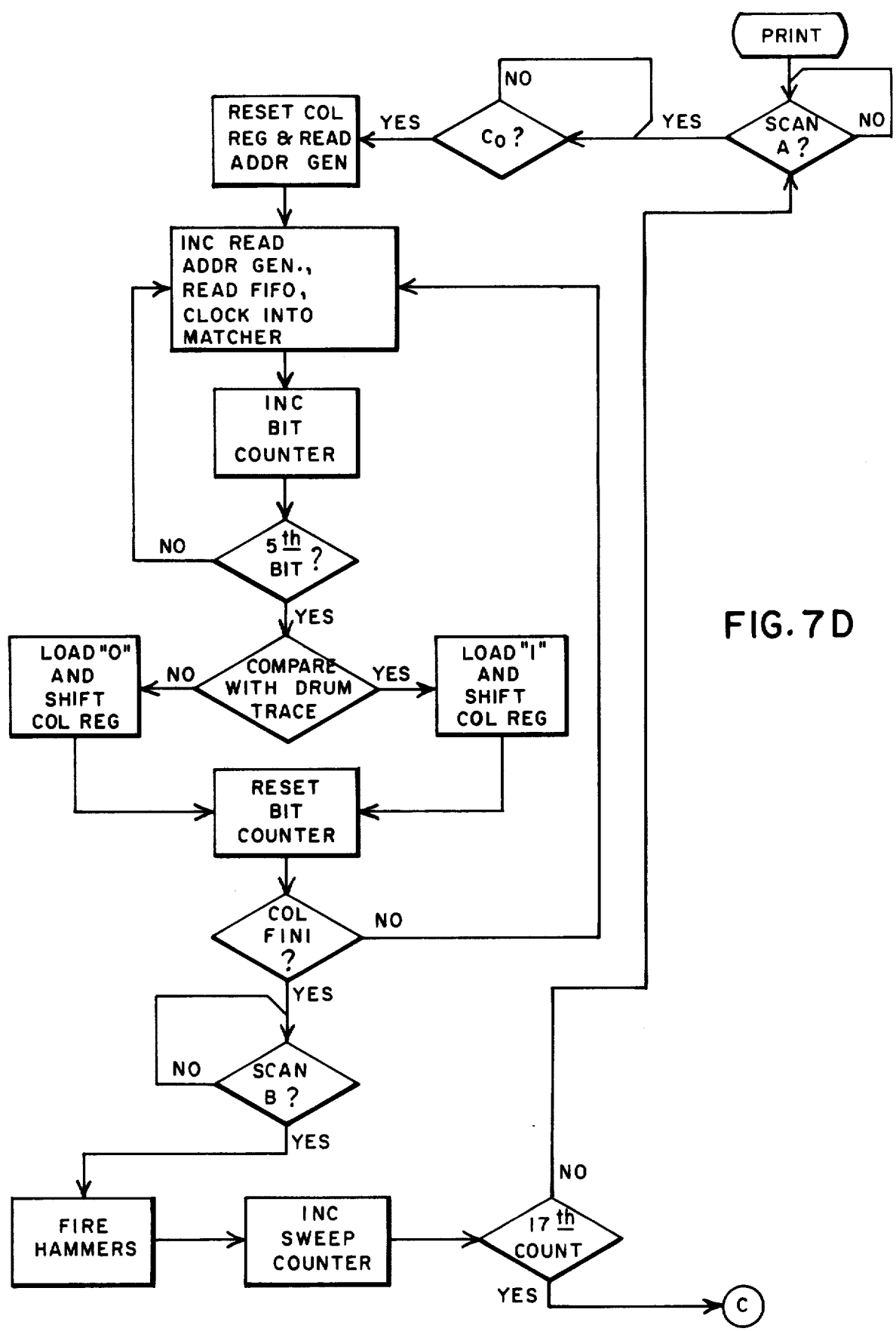
Figure 7E:
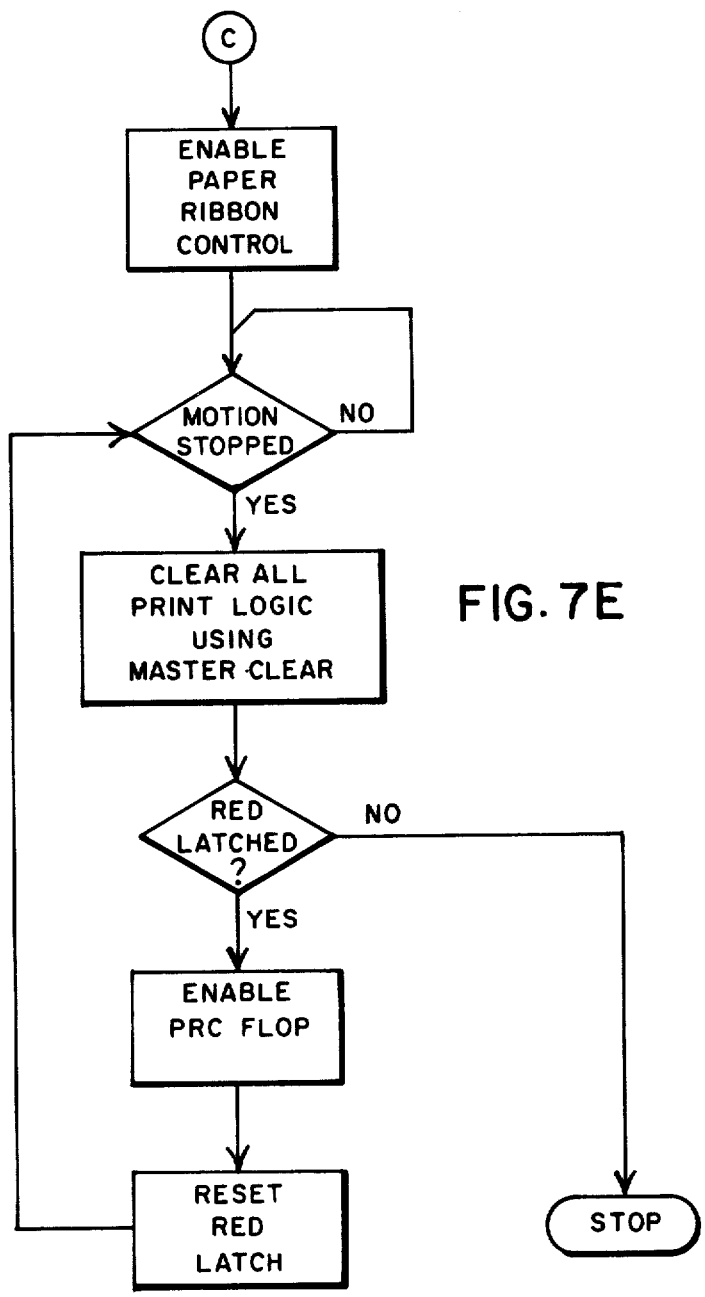

As can be seen by FIGS. 6C and 7A, if no status switch has been closed, none of the latches in latch gate 212 are set so that all of its outputs are high. Thus NAND gate 213 does not condition NOR gate 211 to generate a load signal. NAND gate 208 shown in FIG. 6C receives inputs from terminals E7 and F0. These terminals are shown in FIG. 6B. The signal on terminal E7 is comprised of the received complete signal from terminal C5 of FIG. 6A and the address match signal at terminal D8 which is generated by the address comparator 207 of FIG. 6A. The signal at terminal F0 is comprised of bits 3 and 12 of the address word. When all of these signals are generated and bits 3 and 12 are set for polling, NAND gate 208 will generate an output. Since NOR gate 211 is prevented from generating a load pulse, the output from NAND gate 208 will only generate a transmit pulse from NAND gate 210 to transmit the address word in the Universal Asynchronous Receiver Transmitter back to the central processing unit indicating no status switches have been set. The printing control circuit stops operation and awaits further messages from the central processing unit.

On the other hand, if one or more of the status switches have been closed, appropriate status flip-flops in latch 212 will be set to condition NOR gate 211 to generate a load signal and to set poll flip-flop 209. Poll flip-flop 209 prevents latch 212 from being reset. Upon generation of the receive complete, our address signals (E7) and R3 and R12 polling signals (F0), NAND gate 208 generates an output to reset polling flip-flop 209 which still does not reset latch 212 since NOR gate 214 is now inhibited by D9. The output from NAND gate 208 also generates a load signal through NOR gate 211 to load into the Universal Asynchronous Receiver Transmitter the S2–S5 outputs of latch 212 and a transmit signal through NAND gate 210 to transmit back to the central processing unit the S2–S5 information loaded into the Universal Asynchronous Receiver Transmitter.

If the next address word identifies this station as the station being addressed, the circuit checks for an error signal from the Universal Asynchronous Receiver Transmitter and, if there is an error, it waits until the Universal Asynchronous Receiver Transmitter transmits the message again. Upon a successful transmission where there is no error, the Universal Asynchronous Receiver Transmitter then provides a receive complete signal which conditions the printer control circuit to again inquire whether or not the signal demands a polling operation. If it is a polling operation, the information latch 212 is again transmitted to the CPU. If the next address word which has been received does not indicate that this is the station being addressed, but that some other station has been addressed, the signal is again checked for error and if there is no error and the received complete signal has been generated at terminal C5, NOR gate 214 provides an output to the latch circuit 212 to reset all the latches indicating that the CPU has recived the status information correctly. Thus, the NOR gate 214 checks the receive complete, our address signals at terminal E7 and the address match (1) signal at D9 and the output from the polling flip-flop 209. When the latch 212 has been reset, the operation stops and waits for the next instruction from the central processing unit.

As indicated by the flow chart in FIG. 7, however, if the message which was received at the Universal Asynchronous Receiver Transmitter is not a polling command, the write prime latch 220 of FIG. 6B is set by the output from NAND gate 221 which combines the receive complete C5, address match (0) D8 signals at terminal E7 and the R3 and R12 signals at terminal F0 to set the write prime latch.

The circuit next looks at bits 3 and 12 (FIG. 7B) to determine whether a handshake is required. The handshake latch 222 (FIG. 6C) receives an input from NAND gate 223 which looks at R3, R12 and terminal E7 which is a composite of the receive complete and address match (0) signals. If bits 3 and 12, as discussed above, indicate that a handshake is to be provided, the handshake latch 222 is set by the output from NAND gate 223. If no handshake is to be provided, or, if a handshake is to be provided, the handshake latch is set, and then the circuit waits for a data word.

As mentioned previously, a data word has bit 1 set with a 0. The R1 output of the Universal Asynchronous Receiver Transmitter is connected to terminal C7 of FIG. 6B which, when bit 1 contains a 0 indicating a dta word, provides an input to NAND gate 231. At the time a data word is received, the circuit waits for a receive complete signal and the Universal Asynchronous Receiver Transmitter checks for an error in transmission. If there is an error, the Universal Asynchronous Receiver Transmitter will generate an error signal but not a receive complete signal. If the Universal Asynchronous Receiver Transmitter has generated an error signal at terminal C4, the circuit of FIG. 6F generates two signals, an R3 and error signal at terminal K2 which is a combination of R3 and error at terminals C1 and C4 respectively and an R8 and error signal at terminal K3 which is a combination of R8 and error at terminals D1 and C4 respectively. These terminals, K2 and K3, are connected to the parallel to serial shift register 240 (FIG. 6A). Specifically, R1 at terminal C7 (FIG. 6B) together with the output from write prime latch 220 and the output from NAND gate 232 causes NAND gate 231 to produce an output to set data available latch 230. The output from NAND gate 231, through an inverter, applies a load signal at terminal G0 to load the blank into the parallel to serial shift register 240 (FIG. 6A). At the same time, the error signal at terminal C4 of FIG. 6B is connected through inverter to terminal E8 which is connected to reset the handshake latch 222 (FIG. 6C). The circuit next waits for a scan B pulse interval to load the blank, stored in register 240 (FIG. 6B) into memory 239 which may be a RCA 4061. If a receive complete signal is generated indicating no error in transmission and if R1 is a 0 indicating a data word, terminal C7 provides an input to NAND gate 231. The write prime latch which has been set provides another input to NAND gate 231 and the output of NAND gate 232 which has an input from the error terminal C4 and the receive complete terminal C5 provides a third input to NAND gate 231. Upon receipt of the receive complete signal, gate 231 generates an output which is connected through an inverter to terminal G0. The signal at terminal G0 is applied to a corresponding terminal in FIG. 6A for loading the data word stored in the Universal Asynchronous Receiver Transmitter into parallel to serial shift register 240. The output from gate 231 also sets the data available latch 230. The circuit now waits for a scan B pulse.

Figure 8:
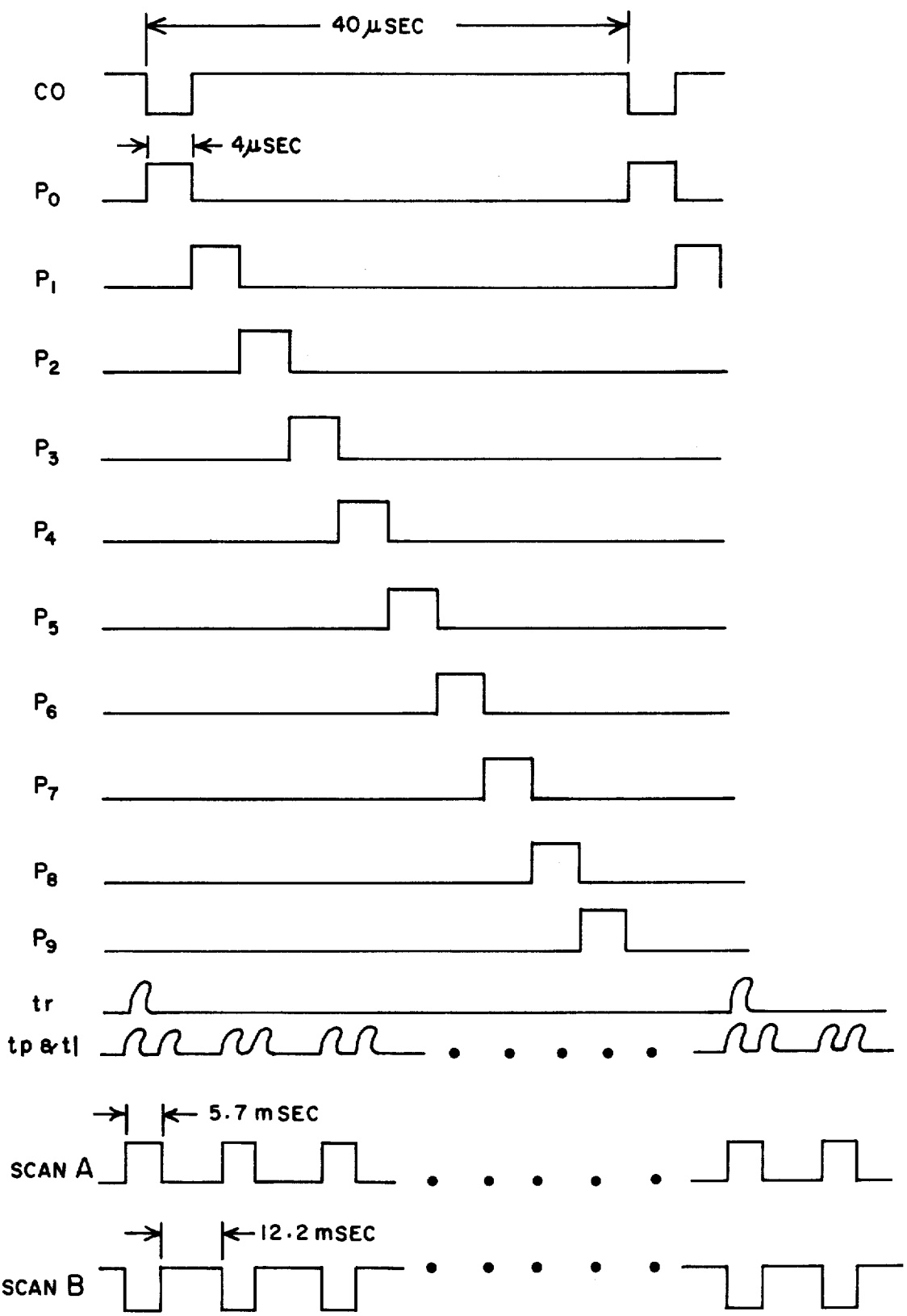
FIG. 8 shows the timing chart for the printer control circuit.

Upon generation of a scan B pulse at F9, flip-flop 233 is operated and the first positive going edge of the C0 pulse operates flip-flop 234 to provide an output to NAND gate 235 to allow the C0 pulses shown in FIG. 8 to clock the write addresser 236 and to the multiplexer 237 and 238 to condition it to write the data into the memory. The write addresser operates through multiplexer 237 and 238 which may be a RCA 4019 for addressing the random access memory (RAM) 239 on a first come, first in basis. The circuit next waits for a C0 pulse.

Upon the occurrence of the next and subsequent C0 pulses, the information stored in the parallel to serial shift register 240 is clocked out by terminal E3 in FIG. 6A to terminal E0 which operates through NAND gate 241 to provide an input to the memory 239 for storage. The C0 pulses also clock the write addresser 236 and the output from the write addresser passes through multiplexer 237 and the output from the write addresser passes through multiplexer 237 and 238 for writing into the RAM 239 the data at its input.

Data is transmitted by the central processing unit in a word which contains two data characters each comprising five bits. The serial register clock pulses, at terminal E3, which clock the information out of the parallel to serial shift register 240 into the memory also clocks ten bit counter 250, FIG. 6B. The D flip-flop in the ten bit counter 250 receives clocking pulses from P8 of the multi-phase clock 251 shown in FIG. 6D for providing an output from the ten bit counter to NAND gate 245. As the tenth bit is written into the memory 239, the output from the flip-flop of ten bit counter 250 is passed through NAND gate 245 for resetting the data available latch 230 to prevent any further operation of the write addresser 236 until the next data word is received. When the next data word is received, bit 1 sets the data available latch 230 and the ten bits comprising the next two characters are written into the memory 239 under the control of the 10 bit counter 250 and C0 pulses.

At this point, NAND gate 243 which is conditioned by the output of NAND gate 231, checks bit 2 of each data word, bit 2 appearing on terminal C8. As soon as a signal is received on terminal C8, the directive flag latch 242 is set which indicates that the word having the directive flag bit set with a 1 is the last data word transmitted by the central processing unit. Thus, the data words being supplied by the central processing unit and received by the Universal Asynchronous Receiver Transmitter are continuously written into the random access memory 239 under the control of the C0 pulses and the scan B pulses and the directive flag latch 242 waits for a directive flag bit. If the directive flag bit is not received, the circuit checks to see if the random access memory is full and, if not, it receives additional data and performs the above noted operation. The NAND gate 244 decodes the output from the write address generator 236 and, when a count of 112, which is the number of possible storage locations in one half of the RAM 239, is reached, NAND gate 244 issues an output through the diode. Thus, until an output from NAND gate 244 occurs, the circuit will continue to write in the incoming words in the memory and when the memory is full the hardware proceeds to the next step of its operation. However, in all cases the directive flag bit should be set with a 1 in the last data word. When the directive flag latch 242 has been set by the directive bit indicating that the last word received is the final data word transmitted by the central processing unit, and an output is supplied to NAND gate 245 from latch 242 which prevents any further output from the ten bit counter 250 resetting the data available latch 230 and at the same time the output from the directive flag latch 242 provides an output to NAND gate 246 for enabling it to set the blank latch 254.

The output from the directive latch 242 is also connected to NAND gate 255 (FIG. 6C). The circuit checks to see if the handshake latch has been set and, if it has not, the system proceeds to set the blank latch and fill memory 239 with blanks. If handshake latch 222 has been set, the directive flag signal at terminal E9 of FIG. 6B is connected to E9 of FIG. 6C for passing the handshake output from the handshake latch 222 through the NAND gate 255 and through NAND gate 210 to supply a transmit pulse to the Universal Asynchronous Receiver Transmitter for returning the last data word received to the central processing unit under the operation as described in association with the Universal Asynchronous Receiver Transmitter circuit above.

As the last data word is written into the memory 239, an output from the ten bit counter 250 is transmitted through NAND gate 246 to set blank latch 254. When NAND gate 246 has received the directive latch output, it is enabled to pass through the tenth bit, which is allowing the writing of the data word last received into the memory 239, to pass through to set blank latch 254 which inhibits any further output from the parallel to serial shift register 240 from being passed through NAND gate 241 and to force a logic 1 into the RAM 239 input. The directive latch output also prevents the resetting of the data available latch 230 which allows C0 pulses to continue to clock the write addresser 236 to write logic ones in the memory 239 until all memory locations in the first half of the memory 239 have been filled. Any five bit character in the memory 239 after the setting of the blank latch will represent a blank since binary values equal to or greater than 16 is interpreted as a blank for printing purposes.

When NAND gate 244 generates the count of 112 signal, all of the logic connected to this output are reset and also a 112 output is produced on terminal E6 of FIG. 6B which is connected to a corresponding terminal on FIG. 6A. This output combined with a scan A output pass through NAND gate 261 and logic circuitry 260 to produce an output at terminal E2, termed the 112 and GO signal. Logic 260 cannot operate until the red latch signal from red latch 263 has been produced. This circuit receives an input over terminal H8 from the paper ribbon and control circuit to assure that, if a red printing operation is to occur, the red ribbon has been set prior to the beginning of the printing operation. Once the motion has stopped, if the red ribbon is to be used, the 112 and GO signal is supplied to NOR gate 262 (FIG. 6B) to toggle the flip-flop 265 at the next scan A pulse. This sets the write pointer flip-flop 266 which, operating through the multiplexer 237-238 controls the highest order storage bit location in the memory 239 for conditioning the memory 239 for writing into the second half and reading out of the first half. At the same time, the $\overline{Q}$ output from flip-flop 265 sets the enable print latch 340 shown in FIG. 6C through NOR gate 267. At this point, the printing operation can be started.

When the enable print latch 340 has been set, an enable print (1) signal is generated at terminal F3 of FIG. 6C which is connected to a corresponding terminal in FIG. 6D for operating NAND gate 270 to provide an output to the D terminal of flip-flop 271. When a scan A pulse is generated, it is connected through a pair of inverters to latch 272 for conditioning NAND gate 273 to transmit the matching signals, to be discussed hereinbelow, to the column shift register 274 shown in FIG. 6G. The scan A pulse also, through the inverters, clocks the D flip-flop 271 to provide an output to the D terminal of flip-flop 275 which conditions, upon the receipt at its clock terminal of the next CO pulse from CO generator 202, NAND gate 276 to pass CO pulses and also conditions the multiplexer at terminal G6 to read the data in the memory. The output from flip-flop 275 also causes NOR gate 313 to supply a signal to NAND gate 312 which, together with a PO pulse supplies a column reset signal through NAND gate 311 to terminal G4. The column shift register 274 is thus reset. NAND gate 281, upon the receipt of a signal from NAND gate 282, uses a P2 pulse for providing a column clock output to clock a 1 into the serial to parallel shift register 274 in FIG. 6G. This signal is called the column fini signal which is produced at terminal F7 when the serial to parallel shift register 274 is full.

The C0 pulses from NAND gate 276 are supplied to the clock terminal of five bit counter 277. These pulses are also supplied to NAND gate 278, which together with the pulse P1, provides a read P1 output at terminal G8. The signal is connected to a corresponding terminal in FIG. 6B for clocking read addresser 279 to take the information previously stored in the first half of the memory 239 out and presents that information at terminal E5 to serial to parallel shift register 280 in FIG. 6D for comparing with the drum position.

The C0 pulse from the NAND gate 276 of FIG. 6D is also supplied to terminal G9 which forms a read XY clock signal which is supplied to a corresponding terminal in FIG. 6C to an input of NOR gate 290. The other input of NOR gate 290 receives the output P3 from the multiphase clock 251 of FIG. 6D which provides an output, read clock P3, on the terminal F6 which is connected to a corresponding terminal in FIG. 6D for clocking the data at terminal E5 into the serial to parallel register 280.

When the five bit counter 277 has reached the count of five indicating that five bits comprising a character have been pulled out of the memory and placed into the serial to parallel shift register 280, the counter provides an output through NAND gate 281 to terminal G7 which is a column clock signal. It also provides an output through NAND gates 293 and 294 to reset the five bit counter 277 using P8 from multi-phase clock 251.

When the five bits have been pulled out of the memory, matcher 292 compares th character presented at the output of serial to parallel shift register 280 with the drum position output from drum tract circuit 291 and produces a 1 at terminal H3, referred to as the column data terminal, if there is a match and a 0 if there is no match. This information is supplied to a corresponding terminal in FIG. 6G which is connected to the input of the serial to parallel shift register 274. The column clock (1) input at terminal G7 next shifts this information into the serial to parallel shift register 274.

Figure 6G:
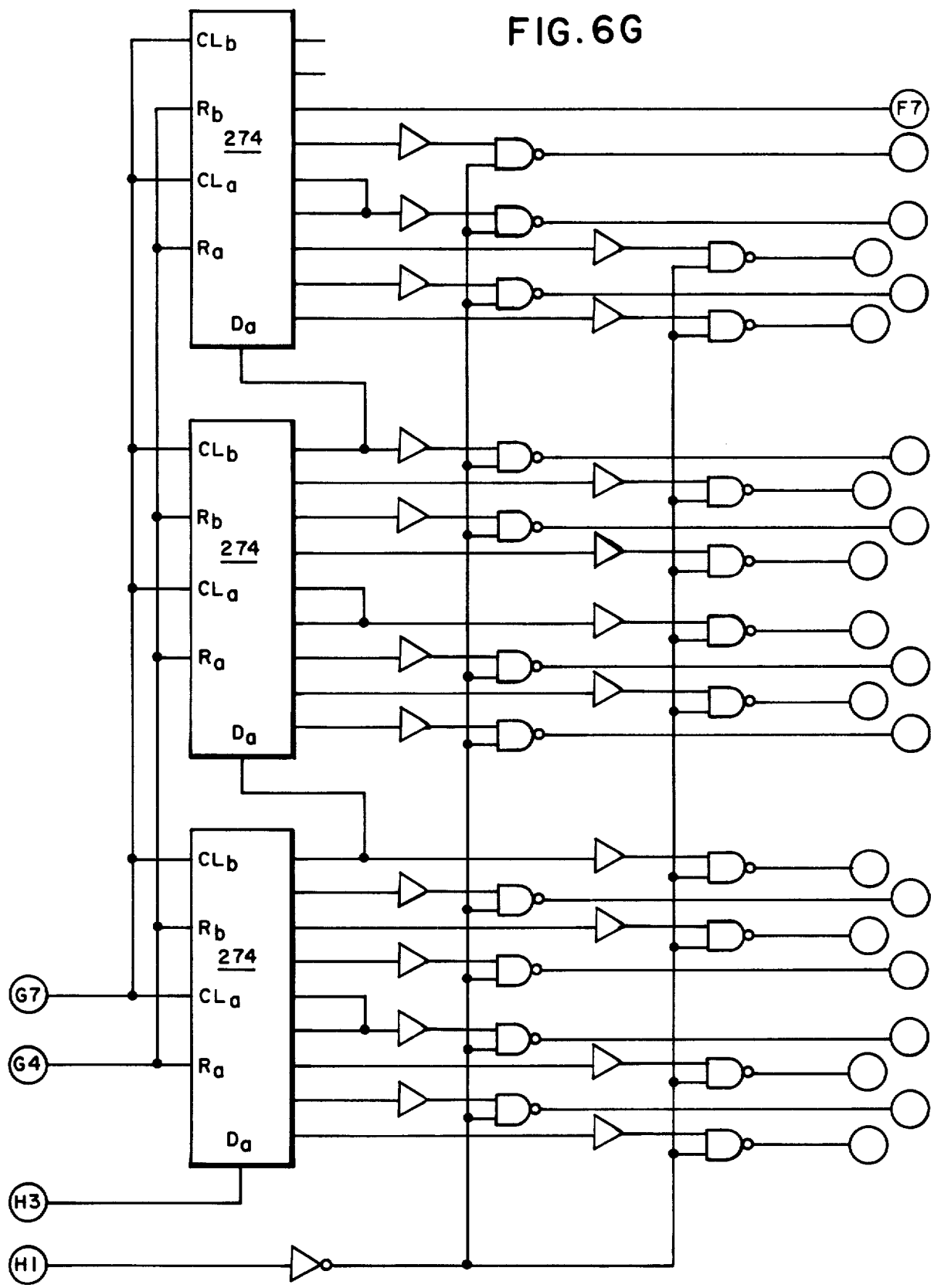

The bits stored in the memory continue to be pulled out and compared with the drum position five bits at a time and the match and non-match signals stored in the serial to parallel shift register 274 of FIG. 6G until the column fini signal which was initially stored in the serial to parallel shift register 274 is produced at terminal F7. This output prevents any further C0 pulses from being transmitted through NAND gate 276 in FIG. 6D and also provides an input to NAND gate 300 of FIG. 6B to reset read addresser 279.

The next scan B pulse at terminal F9 is supplied through NAND gate 301 of FIG. 6D to provide a trigger hammer signal at terminal H1 which signal is connected to a corresponding terminal in FIG. 6G to enable to NAND gate connected thereto to pass the outputs from the serial to parallel shift register 274 to the hammer firing circuits of the printer. Any output from the serial to parallel shift register 274 which is a 1 is passed through these NAND gates and fires the hammers to print the corresponding characters on the printer drum. Thus, one row of characters on the printer drum have been compared with the data stored in the memory to fire certain hammers. To complete the printing of an entire line, all 16 rows of characters on the drum must be compared with the data stored in the memory 239.

The drum rotates to its next position which generates a new set of scan A and scan B pulses to begin the comparison operation again. The scan B pulse which has operated the hammers also resets flip-flops 271 and 275 which increment the sweep counter 310 and the next scan A pulse is transmitted through to begin the comparison operation as described above. After all 16 rows on the printer drum have been compared with the information stored in the first half of memory 239, the sweep counter 310 provides an output on the count of 17. The count of 17 signal is transmitted through NAND gate 311 to terminal G4 which provides a reset column signal to the corrresponding terminal on FIG. 6G for resetting the serial to parallel shift register 274. The count of 17 signal also prevents NAND gate 270 from passing the enable print signal on terminal F3 through to the D terminal of flip-flop 271. The count of 17 is also connected to terminal G5 which is connected to a corresponding terminal in FIG. 6E to allow paper and ribbon control circuit 320 to feed the paper through the printer for the next line of printing and for controlling the ribbon. When the ribbon is fed through for the next printing operation, the paper take up and paper feed reel have been incremented for a new line of printing, the paper and ribbon control generates a reset red-1 signal for resetting the red latch 263 in FIG. 6A and generates a master clear signal at terminal H9. This master clear signal resets sweep counter 310 of FIG. 6D, resets read addresser 279 through NAND gate 300 of FIG. 6B and resets enable print latch 266 of FIG. 6C. When the red latch circuit 263 has been reset, all operation of the circuit ceases and it waits for the next printing operation.

During this printing operation, the other half of the memory can be written into as per the operation described above and at the end of the printing operation with respect to the first half of the RAM 239, the printing operation can begin with the second half of the memory. This operation is under the control of the write pointer flip-flop 266 which is reset by the next clock pulse from flip-flop 265 which is clocked by the scan A pulses.

The entire character comparison operation for one row is accomplished during a scan A pulse although several scan B pulses may be necessary to write the incoming data into the memory. During scan B pulses one half of the memory can be written and during scan A pulses the other half of the memory can be read out for printing.

Many of the gates and latches and flip-flops shown in the drawings have a terminal labeled PC connected thereto. This terminal is a power clear terminal which resets all of the latches, gates, flip-flops when power is initially applied to the printing control circuit.

APPENDIX

Universal Asynchronous Receiver Transmitter

A0 — Shift Register Output
A1 — Count of 15
A2 — Phase 1
A3 — Stop
A4 — Count of 15 Counter Reset
A5 — Load UART
A6 — UART Shift Register Clear
A7 — Phase 2
A8 — Phase 3
A9 — Inverted Phase 3

B0 — Master Clock Input
B1 — UART Shift Register Input
B2 — Transmit Gate Control
B3 — Shift Register Clock
B4 — Three Phase Counter Reset

PRINTER CONTROL

C0 — C0 Pulses from Multiphase Clock
C1 — R3
C2 — R13
C3 — Receive Complete (1)
C4 — Err
C5 — Receive Complete (0)
C6 — Send Complete
C7 — R1
C8 — R2

D1 — R8
D8 — Address Match (0)
D9 — Address Match (1)

E0 — Shift Register 240 Out
E1 — Red 1
E2 — 112 and GO
E3 — Shift Register 240 Clock
E4 — R12
E5 — Memory 239 Out
E6 — 112

E7 — Receive Complete, Our Address (1)
E8 — Inverted Err
E9 — Directive Latch Output F0 — R3 and R12
F1 — Connects Flip-Flop 265 (6B) to NOR 267 (6C)
F2 — Enable Print (0)
F3 — Enable Print (1)
F4 — Receive Complete, Our Address (0)
F5 — Enable Memory
F6 — Read Clock P3-1
F7 — Column Fini
F8 — Scan A
F9 — Scan B
G0 — Load Parallel to Serial Register
G1 — Wave Shaper Output
G3 — Connects C0 Generator 202 (6D) to Paper and Ribbon Control (6E)
G4 — Reset Column Register 274
G5 — Print Enable
G6 — Enable Read XY
G7 — Column Clock
G8 — Read P1
G9 — Read XY Clock H1 — Trigger Hammer
H2 — Inverted Column Fini
H3 — Column Data
H4 — Connects Paper and Ribbon Control 320 (6E) to Sweep Counter 310 Logic (6D)
H5 — Ribbon Feed
H6 — Paper Take Up
H7 — Paper Feed
H8 — Reset Red 1
H9 — Master Clear K1 — Master Clear Inverted
K2 — R3 and Err
K3 — R8 and Err P1 — Output from Multiphase Clock 251
P2 — Output from Multiphase Clock 251
P3 — Output from Multiphase Clock 251
P4 — Output from Multiphase Clock 251
P5 — Output from Multiphase Clock 251
P6 — Output from Multiphase Clock 251
P7 — Output from Multiphase Clock 251
P8 — Output from Multiphase Clock 251
PC — Power Clear
Paper Feed — indicates Paper has been fed through printer S2 — Status Switch (All Point Log)
S3 — Status Switch (Status Summary)
S4 — Status Switch (Alarm Summary)
S5 — Status Switch (Terminal Log)

*tr, tp,* and *tl* — Timing pulses from printer

Err-1 — Error
Recomp — Receive Complete
Scomp — Send Complete

The embodiments of the invention in which an exclusive property or right is claimed are defined as follows:

1. A printer control system for a rotary drum printer for printing data, said data comprising bits divided into characters to be printed, said rotary drum printer having a plurality of columns of characters distributed in rows therealong for printing said characters of data and having hammers associated with each column being controlled by said system, said system comprising:
   storage means for receiving and storing said data;
   drum trace means for providing a drum trace signal dependent upon a position of said drum;
   comparator means connected to both said storage means and said drum trace means for comparing said data, a character at a time, to said drum trace signal and for providing a match signal when there is a match of said data character and said drum position and a non-match signal where there is no match;
   serial shift register means for shifting and storing match and non-match signals, including a serial shift register and means for supplying to said shift register a column finish signal before a comparison operation is started and for supplying said column finish signal out of said serial shift register when said serial shift register is full of match and non-match signals and means responsive to said column finish signal for terminating said comparison operation; and,
   trigger means responsive to said match signals stored in said serial shift register for firing only those hammers corresponding to said match signals after all characters, stored in said storage means, have been compared with said drum position.

2. The system of claim 1 wherein said storage means comprises character supply means for supplying said data, a character at a time, to said comparator means.

3. The system of claim 2 wherein said character supply means includes means responsive to said column finish signal to stop supplying data to said comparator means.

4. The system of claim 1 wherein said storage means comprises a memory, write address means for storing said data in said memory, read address means for supplying said data, a character at a time, to said comparator, and write pointer means for dividing said memory into first and second halves and for controlling into which half said data is stored and out of which half said data is supplied to said comparator.

5. The system of claim 4 wherein said means responsive to said column finish signal includes means for connecting said column finish signal to said read address means to stop supplying data to said comparator means.

6. The system of claim 1 wherein said storage means comprises a memory, write address means for storing said data in said memory, and read address means for supplying said data, a character at a time, from said memory to said comparator.

7. The system of claim 6 wherein said read address means comprises timing means for controlling the supply of data, a character at a time, to said comparator.

8. The system of claim 7 wherein said comparator comprises a serial to parallel shift register for receiving said bits of data, said timing means clocking said bits of data into said serial to parallel shift register.

9. The system of claim 8 wherein said serial shift register means includes counter means responsive to said timing means for shifting said match and non-match signals through said serial shift register as each character is compared with said drum position.

10. The system of claim 9 wherein said trigger means generates a trigger signal and said trigger means comprises logic gates responsive to said match signals and said trigger signals to fire said hammers.

11. The system of claim 1 wherein said trigger means comprises means for generating trigger signals and logic gates responsive to said match signals and said triger signals to fire said hammers.

12. The system of claim 6 wherein said storage means further comprises directive means for generating a directive signal when all data has been received.

13. The system of claim 12 wherein said storage means further comprises blank means responsive to said directive signal for filling up said memory if said memory has not received sufficient data to fill all storage locations.

14. The system of claim 13 wherein said write address means comprises storage full signal means for generating a storage full signal when said storage means is full and said blank means comprises means responsive to said storage full signal for terminating the filling up of the memory with blanks.

15. A printer control system for a rotary drum printer for printing data, said data comprising bits divided into characters to be printed, said rotary drum printer having a plurality of columns of characters distributed therealong in rows for printing said characters of data and having hammers associated with each column being controlled by said system, said system comprising:
pulse supply means for generating a succession of scan A and scan B pulses;
storage means for receiving and storing said data including a memory, a write address means responsive to scan B pulses for storing said data in said memory, read address means responsive to scan A pulses for supplying said data out of said memory and write pointer means for dividing said memory into first and second halves, in responsive to scan A and for controlling pulses, into which half said data is stored and out of which half said data is supplied;
drum trace means for providing a drum trace signal dependent upon the position of said drum;
comparator means for comparing said data supplied out of said memory to said drum position for providing a match signal when there is a match between the data supplied out of said memory and said drum position and a non-match signal when there is no match; and
hammer control means responsive to said match signals for firing only those hammers corresponding to said match signals after all data characters have been compared with said drum position.

16. The system of claim 15 wherein said hammer control means comprises means for generating trigger signals and logic gates responsive to said match signals and said trigger signals to fire said hammers.

17. The system of claim 16 wherein said comparator means comprises first serial to parallel shift register means for presenting the data supplied from said memory in parallel form and a matching circuit for matching said parallel form of said data to said drum trace signal for providing said match and non-match signals.

18. The system of claim 17 wherein said comparator means comprises second serial to parallel shift register means for receiving said match and non-match signals and presenting these signals in parallel form to said hammer control means.

19. The system of claim 18 wherein said second serial to parallel shift register means comprises means for generating a column finish signal to indicate that said second serial to parallel shift register means is full and means connecting said column finish signal to said read address means to stop supplying data to said comparator means.

20. The system of claim 19 wherein said read address means comprises timing means for controlling the supply of bits of data, a character at a time, to said comparator.

21. The system of claim 20 wherein said second serial shift register means include counter means for shifting said match and non-match signals through said serial shift register means as each character is compared with said drum position.

22. The system of claim 15 wherein said write address means include means responsive to the data received for generating a directive signal when the last of the data has been received and blank means, responsive to said directive signal, for filling up the rest of the storage means, which has not been filled by data, with blanks and means for terminating the filling of the storage means with blanks when the storage means is full.

23. The system of claim 22 wherein said write address means comprises storage full signal means for generating a storage full signal when said storage is full and blank means comprises means responsive to said storage full signal for terminating the filling up of the memory with blanks.

24. A printer control system for a rotary drum printer for printing data, said data comprising bits divided into characters to be printed, said rotary drum printer having a plurality of columns of characters distributed in rows therealong for printing said characters of data and having hammers associated with each column being controlled by said system, said system comprising:
pulse supply means for generating a succession of scan A and scan B pulses;
storage means for receiving said storing said data including a memory, a write address means responsive to scan B pulses for storing said data in said memory, read address means responsive to scan A pulses for supplying data out of said memory;
drum trace means responsive to scan B pulses for providing a drum trace signal dependent upon a position of said drum;
comparator means connected to said storage means and said drum trace means for comparing during a scan B pulse said data, a character at a time, to said drum trace signal and for providing a match signal when there is a match of said data character and said drum position and a non-match signal when there is no match;
serial shift register means for shifting and storing said match and non-match signals, said serial shift register means having an output corresponding to each of said signals;
a plurality of logic gates, each gate having a first input connected to a corresponding output from said serial shift register means, a second input, and an output connected to said printer; and,
firing means connected to the second inputs of said plurality of said logic gates and responsive to the next succeeding scan A pulse for firing only those hammers corresponding to said match signals after all characters, stored in said storage means, have been compared with said drum position.

25. The system of claim 24 wherein said serial shift register means includes means for generating a column finish signal to indicate that said serial shift register is full.

26. The system of claim 25, wherein said storage means comprises character supply means for supplying said data, a character at a time, to said comparator means and wherein said character supply means include means responsive to said column finish signal to stop supplying data to said comparator means.

27. The system of claim 24 wherein said storage means comprises a memory, write address means for storing said data in said memory, read address means for supplying said data, a character at a time, to said comparator, and write pointer means for dividing said memory into first and second halves and for controlling into which half said data is stored and out of which half said data is supplied to said comparator.

28. The system of claim 27 wherein said serial shift register means includes means for generating a column finish signal to indicate that said serial shift register is full and said serial shift register means comprises means for connecting said column finish signal to said read address means to stop supplying data to said comparator means.

* * * * *

UNITED STATES PATENT OFFICE
CERTIFICATE OF CORRECTION

PATENT NO. : 4,028,669
DATED : June 7, 1977
INVENTOR(S) : Carlos S. Higashide

It is certified that error appears in the above—identified patent and that said Letters Patent are hereby corrected as shown below:

Column 19, line 37, cancel ", in responsive to scan A";

Column 19, line 38, after "controlling", insert --, in responsive to scan A--.

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*